(12) United States Patent (10) Patent No.: US 9,426,329 B2
Wang et al. (45) Date of Patent: Aug. 23, 2016

(54) IMAGE PROCESSING SYSTEM OF BACKGROUND REMOVAL AND WHITE/BLACK POINT COMPENSATION

(71) Applicant: CSR Imaging US, LP, Burlington, MA (US)

(72) Inventors: Cheng-Yu Wang, Taipei (TW); Chao-Hsin Hung, Taipei (TW); Sung-Chu Lee, Taipei (TW)

(73) Assignee: CSR Imaging US, LP, Burlington, MA (US)

( * ) Notice: Subject to any disclaimer, the term of this patent is extended or adjusted under 35 U.S.C. 154(b) by 4 days.

(21) Appl. No.: 14/328,507

(22) Filed: Jul. 10, 2014

(65) Prior Publication Data

US 2016/0014301 A1 Jan. 14, 2016

(51) Int. Cl.
*H04N 1/38* (2006.01)
*H04N 1/407* (2006.01)
*G06T 7/00* (2006.01)
*G06T 7/40* (2006.01)
*H04N 1/60* (2006.01)

(52) U.S. Cl.
CPC ........... *H04N 1/4074* (2013.01); *G06T 7/0081* (2013.01); *G06T 7/408* (2013.01); *H04N 1/6027* (2013.01); *G06T 2207/10024* (2013.01); *G06T 2207/20144* (2013.01); *G06T 2207/20148* (2013.01)

(58) Field of Classification Search
None
See application file for complete search history.

(56) References Cited

U.S. PATENT DOCUMENTS

| 5,689,590 | A | * | 11/1997 | Shirasawa | H04N 1/60 358/518 |
| 6,674,899 | B2 | * | 1/2004 | Nagarajan et al. | 382/168 |
| 2003/0002059 | A1 | * | 1/2003 | Zaklika et al. | 358/1.9 |
| 2003/0020974 | A1 | * | 1/2003 | Matsushima | G06T 5/008 358/521 |
| 2003/0103671 | A1 | * | 6/2003 | Matsuura | 382/173 |
| 2003/0179391 | A1 | * | 9/2003 | Weldy | 358/1.9 |

\* cited by examiner

*Primary Examiner* — Vincent Rudolph
*Assistant Examiner* — Michael Burleson
(74) *Attorney, Agent, or Firm* — The Marbury Law Group, PLLC

(57) ABSTRACT

Embodiments are directed towards identifying background pixels in a scanned image so that they can be removed from the image. A histogram of each color channel for an initially scanned portion of the image may be determined. The histogram may represent a frequency distribution of pixels in the scanned portion across each color value for each color channel. A white point tracking profile may be determined based on the histogram. The white point tracking profile may identify a range of color values for each channel that are statistically related to a mode color value of a corresponding color channel. When pixels in the scanned image are determined to have a color profile within the white point tracking profile, then those pixels may be modified to a predetermined color profile, such as a maximum color value for each channel. The modified pixels may then be removed from the scanned image.

17 Claims, 14 Drawing Sheets

IMAGE PROCESSING SYSTEM OF BACKGROUND REMOVAL AND WHITE/BLACK POINT COMPENSATION

TECHNICAL FIELD

The present invention relates generally to digital image scanning, and more particularly, but not exclusively, to detecting and removing a background of a scanned image using histogram data.

BACKGROUND

When an image is scanned, every pixel is typically given a color value for each color channel. Sometimes, however, storage and/or printing of the entire image may not be desirable. For example, assume the image to be scanned is a text document that consists of black text on a white sheet of paper. Often the background of these scanned images is of little importance to the user. So, storing each pixel, including the background pixels, can unnecessarily consume a lot of storage resources, especially when a lot of images are scanned at high resolution.

Moreover, printing the scanned image can result in wasted ink/toner and/or an unsatisfactory printed document. This is because each scanned pixel may be printed onto the paper, including all the background pixels. So, if the scanned image is being printed onto a yellow sheet of paper, the white background of the original scanned image may too be printed, resulting in an off-putting document. Background pixels are not easily removed because different types of papers can have different colors and/or shadings of backgrounds. Examples of various types of paper can include, newspapers, recycled paper, coated paper, aged paper (which is often yellowed), or various colored papers. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
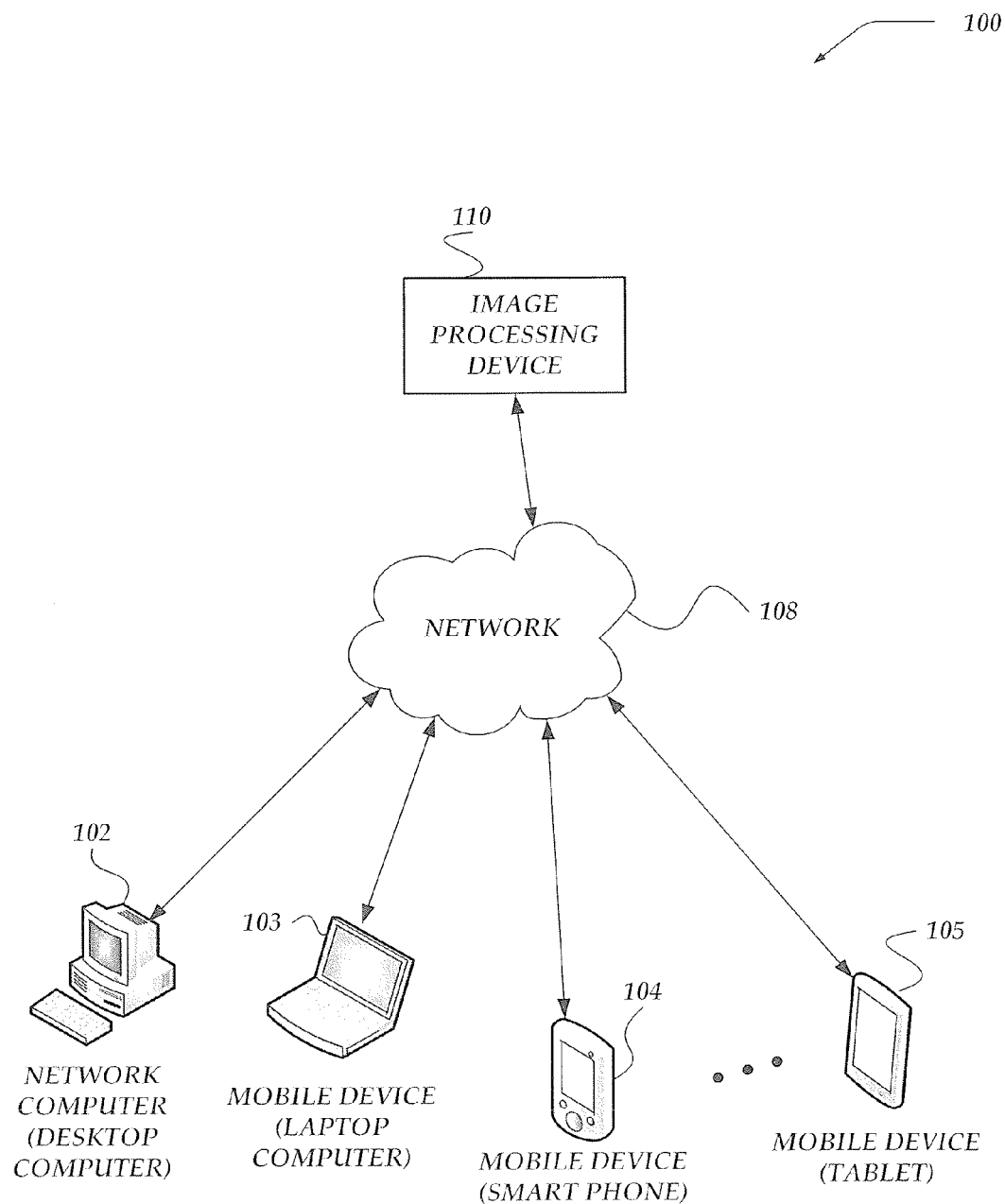
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "color space" may refer to a plurality of color channels that can be used in combination to represent various different colors of the visible light spectrum. For example, the color space may be RGB (red, green, blue). However, embodiments are not so limited and other color spaces may be employed, such as, but not limited to, CMYK (cyan, magenta, yellow, and black), YPbPr, YCbCr, or the like. Each color channel may be a different color in the color space. A color value (or tone) may be a numerical representation of a brightness intensity (or color spectrum) for a color channel, which may include a color spectrum represented by a numerical value. As used herein, a color channel and color value may be represented by the nomenclature red(x), green(y), and blue(z), where x, y, and z are the color values for the corresponding color channel.

As used herein, the term "color profile" may refer to a color value for each separate color channel within a color space. So, a pixel color profile may refer to that pixel's color value for each separate color channel. For example, a pixel may have a color profile of red(34), green(233), and blue (122).

As used herein, the term "histogram" may refer to a graphical representation of a frequency distribution of pixels across each color value for each color channel in a scanned image portion. In various embodiments, the histogram may plot the number of pixels for each color value, where the horizontal axis (or x-axis) represents the color value spectrum and the vertical axis (or y axis) represents the number of pixels in that particular color value. Often the left side of the horizontal axis represents the dark areas (or low color values) and the right side represents the light areas (or high color values).

As used herein, the term "white point tracking profile" or "white point tracking" may refer to a color value or range of color values for each separate color channel within a color space based on histogram data from at least a portion of a scanned image. In various embodiments, the histogram may represent a frequency distribution of pixels in the image portion across each color value for each color channel. In some embodiments, the "white point" may refer to a color profile made up of a mode color value for each color channel based on the histogram data, which may represent an estimate of the background color of an image. In at least one embodiment, the white point may be the combination of the mode color values. In at least one other embodiment, the white point may be a representation of all color channels simultaneously having a maximum color value. In various embodiments, a background pixel may refer to a pixel that has a color profile that falls within or matches the white point tracking profile.

As used herein, the term "white point compensation" may refer to the utilization of the white point tacking profile to detect and/or remove background pixels. In various embodiments, white point compensation may include modifying a gamma correction table based on the white point tracking profile.

As used herein, the term "black point tracking" or "black point tracking profile" may refer to a color profile that includes a minimum color value for each color channel of at least a portion of a scanned image.

As used herein, the term "black point compensation" may refer to the utilization of the black point tracking to expand and/or stretch the color spectrum of each color channel. In various embodiments, black point compensation may include modifying a gamma correction table based on the black point tracking.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to identifying background pixels in a scanned image so that they can be removed from the image. In various embodiments, an initial portion of the image may be scanned. A histogram of each color channel for at least an initially scanned portion of the image may be determined. The histogram may represent a frequency distribution of pixels in the initially scanned portion across each color value for each color channel.

A white point tracking profile may be determined based on the histogram. The white point tracking profile may identify a range of color values for each channel that are statistically related to a mode color value of a corresponding color channel. In various embodiments, the range of color values for each channel that are statistically related to the mode color value of the corresponding color channel may be determined based on a standard deviation of color values according to the mode color value.

In various embodiments, a plurality of bands of the image may be employed to determine separate histograms and white point tracking profiles for each band, where a white point tracking profile for a given band may be determined based on at least the corresponding histogram for the given band. In some embodiments, when at last a portion of pixels in a band are determined to have a color profile within the corresponding white point tracking profile for that band, the at least portion of pixels in that band may be modified to the predetermined color profile. In other embodiments, the white point profile for each band may be a subset white point tracking profile, such that a combination (e.g., an average) of a plurality of subsets of white point tracking profiles may be employed to determine the white point tracking profile.

When at least a portion of the pixels in the scanned image are determined to have a color profile within the white point tracking profile, then the at least portion of pixels may be modified to a predetermined color profile. In at least one of various embodiments, the predetermined color profile may include a maximum color value for each channel. In some embodiments, a gamma correction table may be modified based on the white point tracking profile and the predetermined color profile. The modified gamma correction table may be employed to modify the pixels in the scanned image. The modified pixels may then be removed from the scanned image.

In some embodiments, black point tracking may be determined based on each color channel's lowest color value in at least the initially scanned portion of the image. Based on the black point tracking, each color channel's color spectrum may be expanded by normalizing each color channel's lowest color value to a predetermined color value.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include image processing device 110, network computer 102, mobile devices 103-105, and network 108.

At least one embodiment of mobile devices 103-105 is described in more detail below in conjunction with mobile device 200 of FIG. 2. Briefly, in some embodiments, mobile devices 103-105 may be configured to communicate with image processing device 110 and/or other network computers.

At least one embodiment of network computer 102 is described in more detail below in conjunction with network computer 300 of FIG. 3. Briefly, in some embodiments, network computer 102 may be configured to communicate with image processing device 110 and/or other network computers.

In some embodiments, at least some of mobile devices 103-105 and/or network computer 102 may operate over a wired and/or wireless network to communicate with other computing devices or image processing device 110. Generally, mobile devices 103-105 and/or network computer 102 may include computing devices capable of communicating over a network to send and/or receive information, perform various online and/or offline activities, or the like. It should be recognized that embodiments described herein are not constrained by the number or type of remote computers employed, and more or fewer remote computers—and/or types of remote computers—than what is illustrated in FIG. 1 may be employed.

Devices that may operate as mobile devices 103-105 and/or network computer 102 may include various computing devices that typically connect to a network or other computing device using a wired and/or wireless communications medium. Mobile devices 103-105 may include portable computers, and network computer 102 may include non-portable computers, any of which may operate as client computers, server computers, or the like. Examples of network computer 102 may include, but is not limited to, desktop computers, personal computers, multiprocessor systems, microprocessor-based or programmable electronic devices, network PCs, or the like, or integrated devices combining functionality of one or more of the preceding devices. Examples of mobile devices 103-105 may include, but are not limited to, laptop computers (e.g., mobile device 103), smart phones (e.g., mobile device 104), tablet computers (e.g., mobile device 105), cellular telephones, display pagers, radio frequency (RF) devices, infrared (IR) devices, Personal Digital Assistants (PDAs), handheld computers, wearable computing devices, or the like, or integrated devices combining functionality of one or more of the preceding devices. As such, network computer 102 and/or mobile devices 103-105 may include computers with a wide range of capabilities and features.

Network computer 102 and/or mobile devices 103-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, network computer 102 and/or mobile devices 103-105 may be enabled to connect to a network through a browser, or other web-based application.

Network computer 102 and/or mobile devices 103-105 may further be configured to provide information that identifies the remote computer. Such identifying information may include, but is not limited to, a type, capability, configuration, name, or the like, of the remote computer. In at least one embodiment, a remote computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of image processing device 110 is described in more detail below in conjunction with image processing device 400 of FIG. 4. Briefly, in some embodiments, image processing device 110 may be a scanner or multi-function scanner/printer/copier operative to at least scan images. In some embodiments, image processing device 110 may be configured to communicate with one or more of network computer 102 and/or mobile devices 103-105. Image processing device 110 may communicate with network computer 102 and/or mobile devices 103-105 via network 108.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including network computer 102 and/or mobile devices 103-105, image processing device 110, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks (CANs), Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least mobile devices 103-105. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between network computer 102, mobile devices 103-105, image processing device 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Mobile Device

Figure 2:
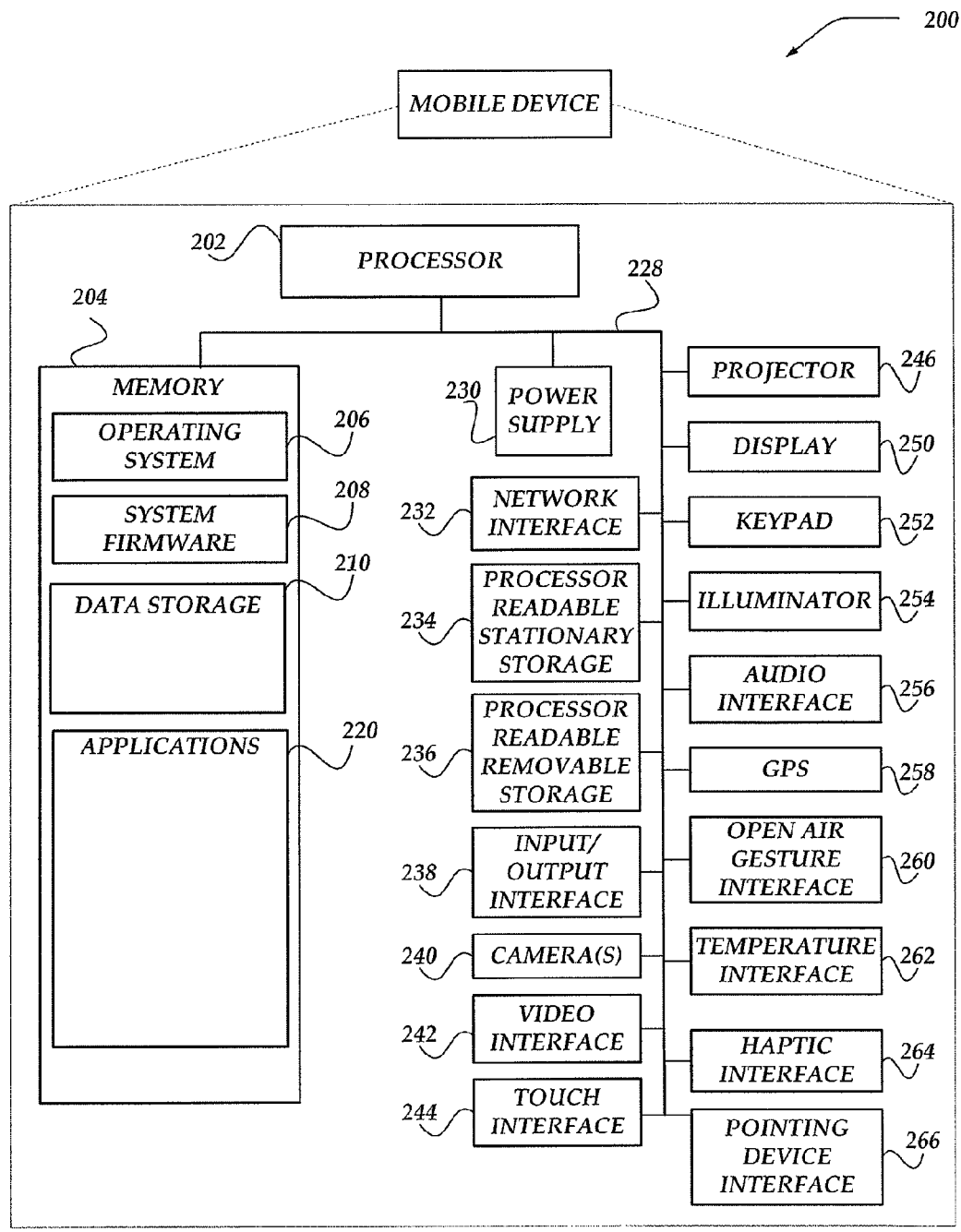
FIG. 2 shows an embodiment of a network computer that may be included in a system such as that shown in FIG. 1.

FIG. 2 shows one embodiment of mobile device 200 that may include many more or less components than those shown. Mobile device 200 may represent, for example, at least one embodiment of mobile device 103-105 shown in FIG. 1.

Mobile device 200 may include processor 202 in communication with memory 204 via bus 228. mobile device 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266. Mobile device 200 may optionally communicate with a base station (not shown), or directly with another computer. And in one embodiment, although not shown, an accelerometer or gyroscope may be employed within mobile device 200 to measuring and/or maintaining an orientation of mobile device 200.

Power supply 230 may provide power to mobile device 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile device 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile device 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile device 200 may also comprise input/output interface 238 for communicating with external peripheral devices or other computers such as other mobile computers and network computers. Input/output interface 238 may enable mobile device 200 to communicate with one or more image processing devices, such as image processing device 110 of FIG. 1. Other peripheral devices that mobile device 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a mobile device. For example, the haptic interface 264 may be employed to vibrate mobile device 200 in a particular way when another user of a computer is calling. Temperature interface 262 may be used to provide a temperature measurement input and/or a temperature changing output to a user of mobile device 200. Open air gesture interface 260 may sense physical gestures of a user of mobile device 200, for example, by using single or stereo video cameras, radar, a gyroscopic sensor inside a computer held or worn by the user, or the like. Camera 240 may be used to track physical eye movements of a user of mobile device 200.

GPS transceiver 258 can determine the physical coordinates of mobile device 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, mobile device 200 may, through other components, provide other information that may be employed to determine a physical location of the mobile computer, including for example, a Media Access Control (MAC) address, IP address, and the like.

Human interface components can be peripheral devices that are physically separate from mobile device 200, allowing for remote input and/or output to mobile device 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A remote computer may include a browser application that is configured to receive and to send web pages, web-based messages, graphics, text, multimedia, and the like. The remote computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile device 200. The memory may also store operating system 206 for controlling the operation of mobile device 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by remote computer 200 to store, among other things, applications 220 and/or other data. For example, data storage 210 may also be employed to store information that describes various capabilities of mobile device 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of mobile device 200, including, but not limited to, non-transitory processor-readable removable storage device 236, processor-readable stationary storage device 234, or even external to the mobile device.

Data storage 210 may store documents 212 or other data files. Documents 212 may include one or more documents that may be editable by a user by employing document-processing application 222. In some embodiments, document-processing application 222 or another application (e.g., a web browser) may be utilized to forward, send, and/or otherwise transfer a document (or other file) to another computing device, such as image processing device 110 of FIG. 1. In at least one such embodiment, the document may be transferred to the other computing device in its native file format (i.e., without first converting the documenting into another file format, such as an intermediate page description language).

Applications 220 may include computer executable instructions which, when executed by mobile device 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In some embodiments, applications 220 may include an application that may process an image to remove its background in accordance with embodiments described herein. For example, camera 240 may be employed to capture an image. An application (or app) may be employed to process the captured image in accordance with embodiments described herein. So, in some embodiments, mobile device 200 may be enabled to employ various embodiments, combinations of embodiments, processes, or parts of processes, as described herein.

Illustrative Network Computer

Figure 3:
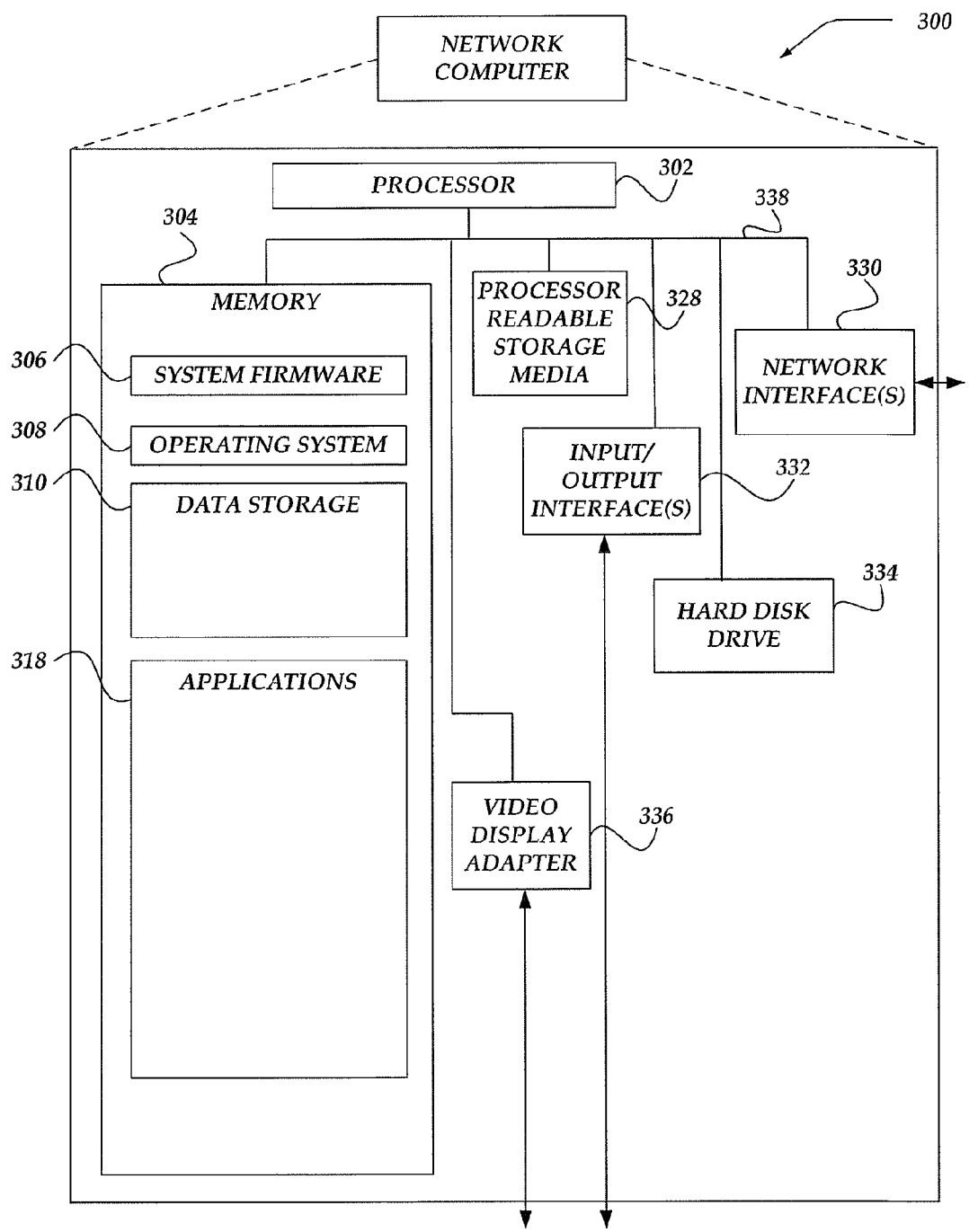
FIG. 3 shows an embodiment of a mobile device that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other device. Network computer 300 may represent, for example network computer 102 of FIG. 1, and/or other network devices.

Network computer 300 includes processor 302, processor readable storage media 328, network interface unit 330, an input/output interface 332, hard disk drive 334, video display adapter 336, and memory 304, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, image processing device (e.g., image processing device 110 of FIG. 1) or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 stores operating system 308 for controlling the operation of network computer 300. Any general-purpose operating system may be employed. System firmware 306 is also provided for controlling the low-level operation of network computer 300 (e.g., BIOS).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, applications 318 and/or other data. For example, data storage 310 may also be employed to store information that describes various capabilities of network computer 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of network computer 300, including, but not limited to processor-readable storage media 328, hard disk drive 334, or the like.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

In some embodiments, applications 318 may include an application that may process an image to remove its background in accordance with embodiments described herein. So, in some embodiments, network computer 300 may be enabled to employ various embodiments, combinations of embodiments, processes, or parts of processes, as described herein.

Illustrative Image Processing Device

Figure 4:
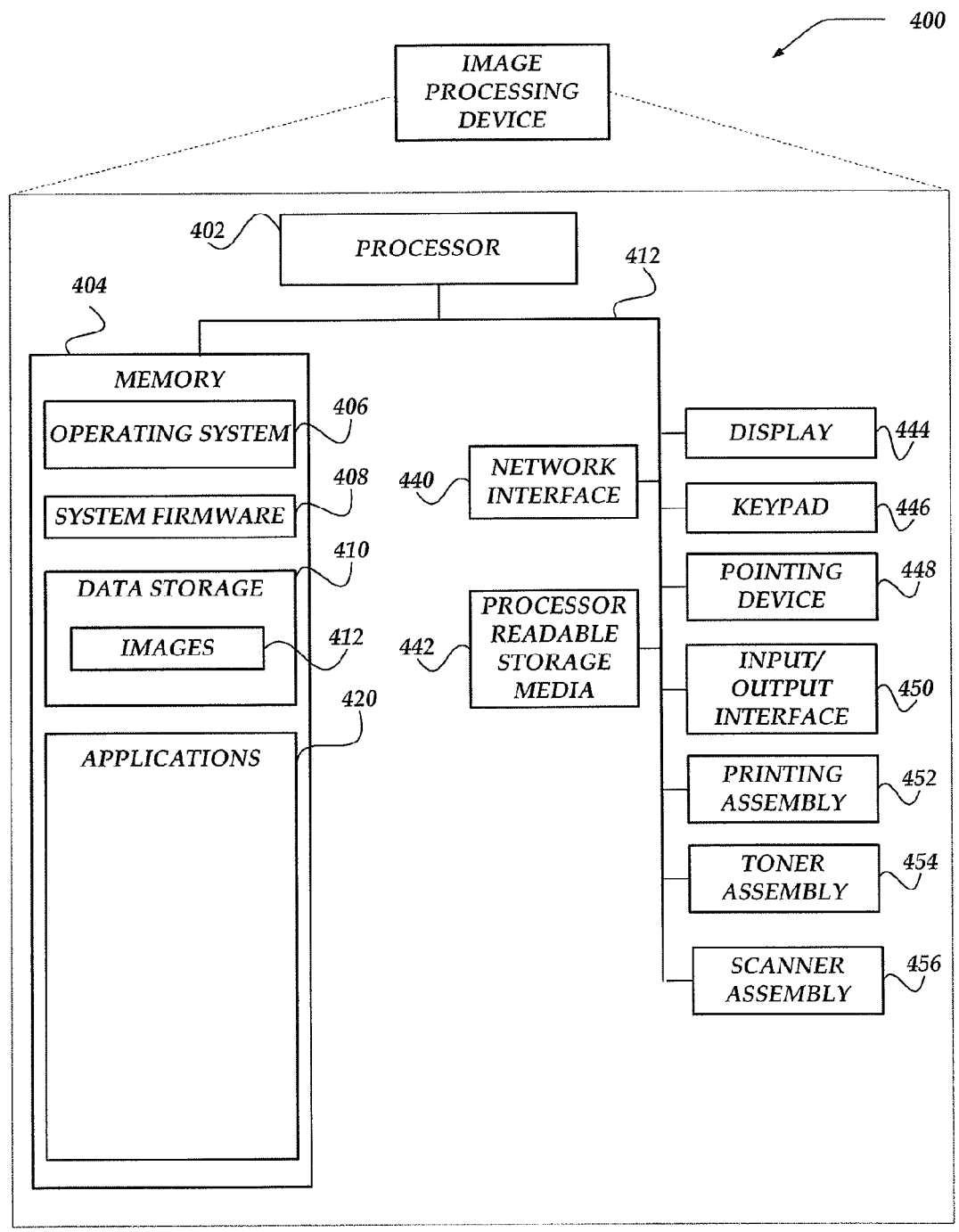
FIG. 4 shows an embodiment of an image processing device that may be included in a system such as that shown in FIG. 1.

FIG. 4 shows one embodiment of image processing device 400 that may be included in a system implementing the invention. Image processing device 400 may include many more or less components than those shown in FIG. 4. However, the components shown are sufficient to disclose an illustrative embodiment for practicing the present invention. Image processing device 400 may represent, for example, image processing device 110 of FIG. 1. In various embodiments, image processing device 400 may be employed to perform various embodiments described herein, including processes or parts of processes 600, 700, and 800 of FIGS. 6, 7, and 8, respectively.

In some embodiments, image processing device 400 may be configured to scan, print, and/or copy an image using various image processing technologies. For example, image processing device 400 may scan documents utilizing various scanning technologies, including, but not limited to, flatbed scanners (e.g., charge-coupled device (CCD), contact image sensor (CIS)), drum scanners, hand scanners, smartphone scanner apps, or the like. In other embodiments, image processing device 400 may print an image utilizing various printing technologies, including, but not limited to, laser printers, LED printers (or other toner-based printing technologies), liquid inkjet printers, solid ink printers, dye-sublimation printers, inkless printers such as thermal printers and UV printers, dot-matrix printers, ink-based plotters, or the like. In some embodiments, image processing device 400 may represent a multi-function printer (MFP). In various embodiments, image processing device 400 may employ embodiments of both scanning and printing to perform scanning operations.

As shown, image processing device 400 may include processor 402, one or more network interfaces 440, processor readable storage media 442, display 444, keyboard and/or keypad 446, pointing device 448, input/output interface 450, printing assembly 452, toner assembly 454, scanner assembly 456, and memory 404, all in communication with each other via bus 412.

Image processing device 400 may communicate with a remote computer, such as mobile device 200 of FIG. 2 or network computer 300 of FIG. 3, the Internet, or some other communications network, via network interface(s) 440. Network interface 440 may enable various communication protocols including but not limited to TCP/IP, Wi-Fi, Bluetooth, or the like. Communications may also be over a universal serial port (USB); a parallel port; a serial bus such as RS-232 (Recommended Standard 232), ANSI/TIA/EIA-422, or the like; IEEE 1394 (e.g., Firewire); or the like. Network interface unit(s) 440 is sometimes known as a transceiver, transceiving device, or network interface card (NIC).

Display 444 may include virtually any type of display, monitor, terminal, screen and the like that displays text, graphics, images, and/or any other type of data to a user. Types of displays may include, but are not limited to, a liquid crystal display (LCD), gas plasma, light emitting diode (LED), cathode ray tube (CRT), or the like. Display 444 may also interface with keyboard/keypad 446 and/or pointing device 448 to receive and/or display user input. Additionally, or alternatively, image processing device 400 may communicate with one or more display devices that are external to the image processing device, to display information regarding print jobs, scan jobs, or the like.

Keyboard/keypad 446 may comprise any input device arranged to receive input from a user. For example, keyboard/keypad 446 may include a push button numeric dial, keyboard, touch screen, or the like. Keyboard/keypad 446 may include alphabetic inputs, numeric inputs, and/or other character inputs, and may further include function and/or command buttons associated with functionality for selecting, examining, editing, and/or printing documents. User inputs made via keyboard/keypad 446 may be shown in display 444.

Pointing device 448 may include virtually any device that enables a user to input spatial and/or positional data to image processing device 400. Pointing device 448 may include devices based on the user touching a surface, such as a touchpad, touchscreen, graphics tablet, joystick or pointing stick, either with a body part (e.g. finger or hand) or with an object such as a wand, stylus, pen, lightpen and the like. Pointing device 448 may further include devices based on the user moving an object, such as a mouse, trackball, joystick, and the like. User inputs made via pointing device 448 may be shown in display 444.

Input/output interface 450 may include various means for communicating with external devices, such as external displays, user input devices, computer devices, networking devices, and the like. Input/output interface 450 may employ one or more communications technologies including but not limited to USB, Bluetooth, serial port (e.g. RS-232 standard), parallel port (e.g. IEEE 1284 standard), and the like. In some embodiments, a USB driver or other portable storage device may communicated with image processing device 400 through input/output interface 450 and be utilized to provide a document to image processing device 400.

Memory 404 may include RAM, ROM, and/or other types of memory. Memory 404 illustrates an example of computer-readable storage media (devices) for storage of information such as computer-readable instructions, data structures, program modules or other data. Memory 404 may store system firmware 408 for controlling low-level operation of image processing device 400. The memory may also store operating system 406 for controlling the operation of image processing device 400. It will be appreciated that this component may include a general-purpose operating system such as a version of UNIX, or LINUX™, or a specialized operating system designed and created to support the functionality of image processing device 400. The operating system may include or interface with a virtual machine module such as the Java virtual machine or Microsoft .NET runtime that may enable control of hardware components and/or operating system functions via applications that run under such virtual machine modules.

Although illustrated separately, memory 404 may include processor readable storage media 442. Processor readable storage media 442 may be referred to and/or include computer readable media, computer readable storage media, and/or processor readable storage device. Processor readable storage media 442 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by image processing device 400 to store, among other things, applications 420 and/or other data. For example, data storage 410 may also be employed to store information that describes various capabilities of image processing device 400. The information may then be provided to another device based on any of a variety of events, including being sent as part of a header during a communication, sent upon request, or the like.

Data storage 410 may also store program code, instructions, and/or data. For example data storage 410 may be configured to store imaging commands, diagnostics, user preferences, imaging control software, information regarding the capabilities of the image processing device such as supported color palettes, fonts, pagination, page size, and the like. Data storage 410 may further store images that are scanned (e.g., images 412), documents to be printed (e.g., queuing multiple print jobs), or the like, as well as any other information needed for selecting, examining, editing, modifying, displaying, scanning, copying, and/or printing an image, document, or file.

Applications 420 may include computer executable instructions, which may be loaded into mass memory and run on operating system 406. Applications 420 may include an application that is enabled to employ embodiments described herein. In various other embodiments, image processing device 400 may include circuitry and/or hardware (e.g., an application-specific integrated circuit (ASIC)) to perform embodiments described herein. In yet other embodiments, combinations of software and hardware may also be employed.

As stated herein, image processing device 400 may incorporate various types of scanning and/or printing technologies without departing from the scope of the invention. In some embodiments, scanner assembly 456 that may be configured to employ various scanning technologies for scanning a document to create a digital image that includes a plurality of pixels. For example, in a CCD flatbed scanner, scanner assembly 456 may include a glass pane, under which a bright light can illuminate the pane, and a moving optical array. A CCD-type scanner may typically contain three rows of sensors with red, green, and blue filters. In another example, a CIS scanner, scanner assembly 456 may include a moving set of red, green, and blue LEDs strobed for illumination, and a connected monochromatic photodiode array under a rod lens array for light collection. Images to be scanned may be placed face down on the glass, an opaque cover may be lowered over the image to exclude ambient light, and the sensor array and light source move across the pane, reading the entire area. However, embodiments are not so limited, and other scanning technologies may also be employed.

In some embodiments, image processing device 400 may be configured to employ laser printing technology. The following is an example, non-limiting description of laser printing technology that may be employed to implement embodiments of the invention. In such embodiments, printing assembly 452 may include such elements as are necessary for laser printing, such as a drum assembly, corona wire, fuser, discharge lamp, laser scanning unit, and/or photoreceptor. In some embodiments, drum assembly may be configured to revolve, and may be made of any of a variety of photoconductive materials. The drum assembly may be given an electric charge by the corona wire (or in some embodiments by a charged roller). As the drum assembly rotates, a laser scanning unit may direct a laser beam across the drum assembly's surface based on the data to be printed. A toner assembly 454 may provide toner, such as in a powder form, onto the drum assembly. A corona wire may further provide a charge to paper or other print material, which may then be moved over the drum assembly. The paper or other print material may then pass through a fuser such that the applied toner is heated or otherwise caused to adhere to the paper or other print material. Upon depositing toner to the paper or other print material, the surface of the drum of the drum assembly may pass a discharge lamp where a light, or the like, may expose the drum to erase or remove the electrical image. In one embodiment, the drum surface of the drum assembly may then pass the corona wire, which may then reapply a charge. It should be noted that embodiments of the invention are not limited to this method of transferring data onto a print material, and other mechanisms may also be used. Thus, the invention is not to be constrained or otherwise narrowed by this embodiment.

In various embodiments, printing assembly 452 and/or toner assembly 454 may communicate with a print engine driver to facilitate printing of documents and other files and/or images. A print engine driver may be responsible for numerous actions associated with the physical printing of the document, including, but not limited to, setting up the print engine to print a page, requesting paper to be fed through the printer, passing the application generated raster data (e.g., image representation) to the print engine, monitoring for completion of the print job, monitoring for errors, or the like. The print engine driver may select a paper size, media type, input tray, output bin, other finishing options or print engine parameters, or the like. In various embodiments, the print engine driver and/or the physical print engine may be capable of handling one or more pages in parallel.

In various embodiments, image processing device 400 may include hardware components, software components, or a combination thereof, to employ embodiments described herein. For example, image processing device 400 may include a scanning component (or scanner input component), a histogram generation component (or a histogram white point tracking component), and a white point compensation component. The scanning component may be operative to scan an image. The histogram generation component may be operative to determine a histogram of each color channel for at least an initially scanned portion of the image. And the white point compensation component may be operative to determine a white point tracking profile based on the histogram, modify at least portion of pixels that have a color profile within the white point tracking profile to a predetermined color profile, and remove the modified pixels from the scanned image.

Example System Diagram

Figure 5:
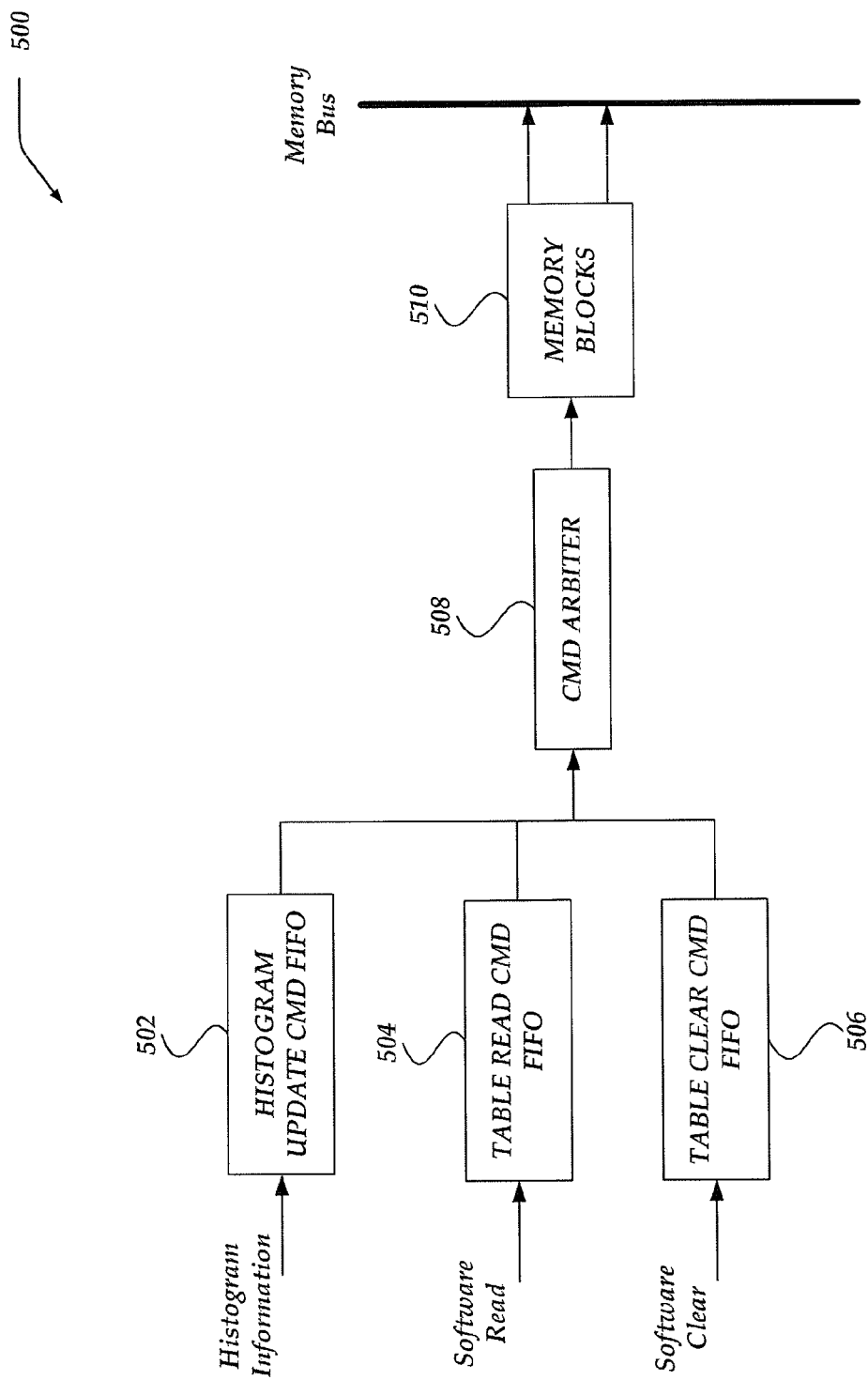
FIG. 5 shows a block diagram generally showing an embodiment of circuit logic that may employ various command priorities to perform white point and black point tracking.

FIG. 5 shows a block diagram generally showing an embodiment of circuit logic that may employ various command priorities to perform white point tracking and black point tracking System 500 may include histogram update command FIFO (first in first out) 502, table read command FIFO 504, and table clear command FIFO 506. Histogram information may be input into histogram update command FIFO 502 (e.g., pixel collection commands). Software may provide read requests to table read command FIFO 504. And software may provide clear requests to table clear command FIFO 506.

Command arbiter 508 may be operative to provide priority logic for accessing memory blocks. Command arbiter 508 may manage time slot stealing and command priority between histogram update command FIFO 502, table read command FIFO 504, and table clear command FIFO 506. Based on this priority logic, command arbiter 508 may coordinate access to memory blocks 510, and thus the memory bus, according to the priority assigned to each command (update command, read command, and clear command). The command FIFO arrangement can enable hardware to utilize computation capabilities and prevent from overflowing. In some embodiments, command arbiter may enable queued commands to steal currently running command's time slot as long as current command is not sabotaged by the queued commands.

In various embodiments, pixel collection commands and/or user operation commands may be employed in a circuit, such that they may be prioritized so as to determine the speed and quality of pixel collection and user operation.

General Operation

Operation of certain aspects of the invention will now be described with respect to FIGS. 6-8. In at least one of various embodiments, at least a portion of Processes 600, 700, and 800 described in conjunction with FIGS. 6-8, respectively, may be implemented by and/or executed on an image processing device, such as image processing device 400 of FIG. 4, and/or one or more network computers or mobile devices, such as network computer 200 of FIG. 2 and mobile device 300 of FIG. 3, respectively. Additionally, various embodiments described herein can be implemented in a system such as system 100 of FIG. 1.

Figure 6:
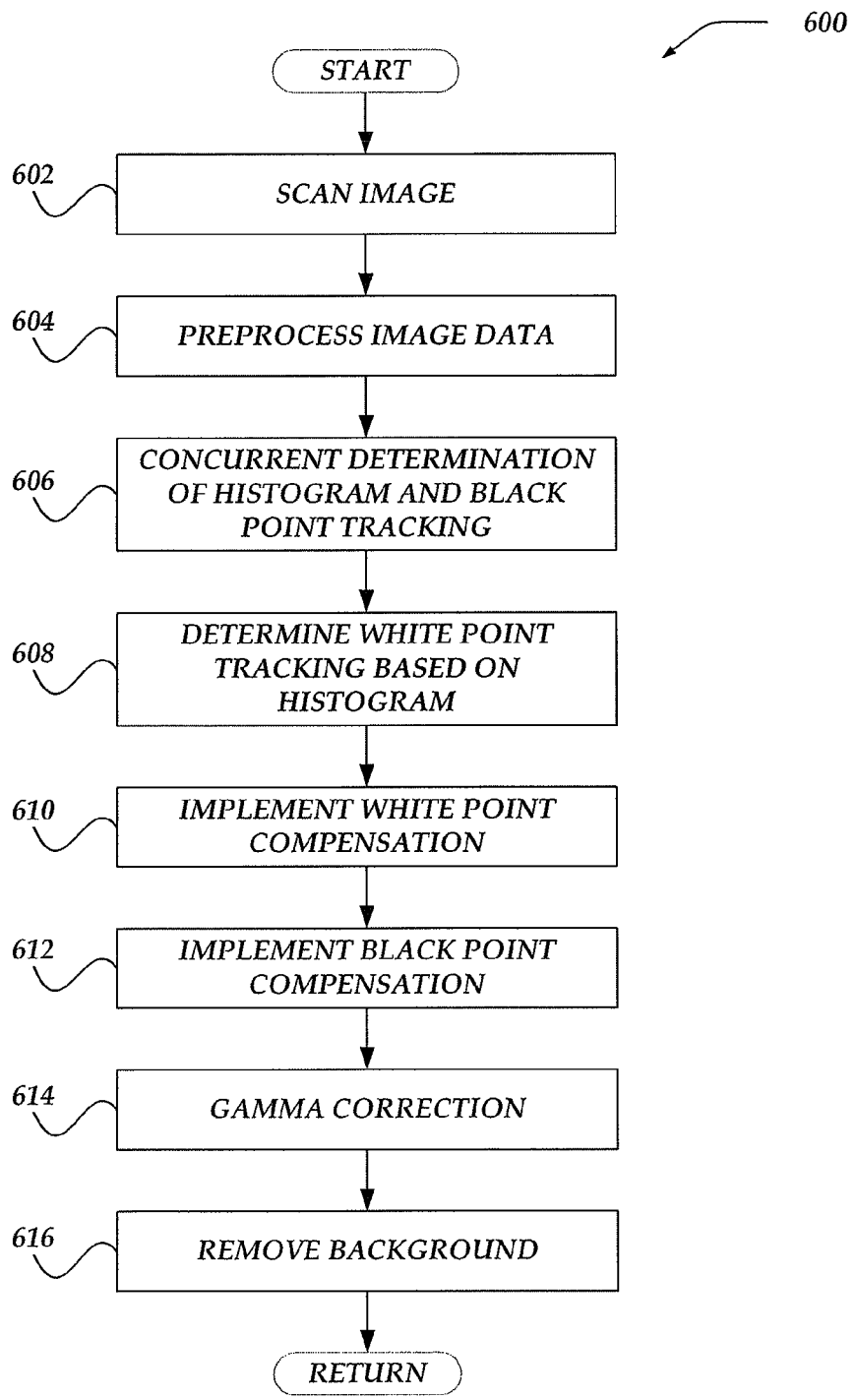
FIG. 6 illustrates a logical flow diagram generally showing an embodiment of an overview process for determining white point compensation based on histogram data for removal of background pixels from an image and for determining black point compensation to stretch the color spectrum of the image.

FIG. 6 illustrates a logical flow diagram generally showing an embodiment of an overview process for determining white point compensation based on histogram data for removal of background pixels from an image and for determining black point compensation to stretch the color spectrum of the image;

Process 600 may begin, after a start block, at block 602, where an image may be scanned. In some embodiments, the entire image may be scanned. In other embodiments, a subset or portion of the image may be scanned.

Process 600 may proceed to block 604, where the scanned image data may be preprocessed to calibrate the data and to normalize and remove effects caused by image capture sensors. In various embodiments, the preprocessing may include shading correction, fringe correction, 1D lookup table adjustment, or the like. Shading correction may include algorithms and/or methods for reducing shading that may be caused by non-uniform illumination, non-uniform camera sensitivity, lens defects, or the like. Fringe correction may include algorithms and/or methods for correcting color aberrations. 1D lookup table adjustment may include algorithms and/or methods for adjusting brightness and/or contrast. These preprocessing methods are examples and should not be construed as being limited, and other image preprocessing may be performed.

In various embodiments, hardware circuits may be designed and employed to perform these preprocessing tasks in a single pass through the hardware, which can maximize speed and/or give users flexibility to combine or remove processing units.

Process 600 may continue at block 606, where histogram and black point tracking may be concurrently determined. In various embodiments, both the histogram determination and the black point tracking may be separately performed for each separate color channel. Throughout this specification, the RGB (red, green, blue) color space is described. However, embodiments are not so limited and other color spaces may be employed, such as, but not limited to, CMYK (cyan, magenta, yellow, and black), YPbPr, YCbCr, or the like.

Figure 9:
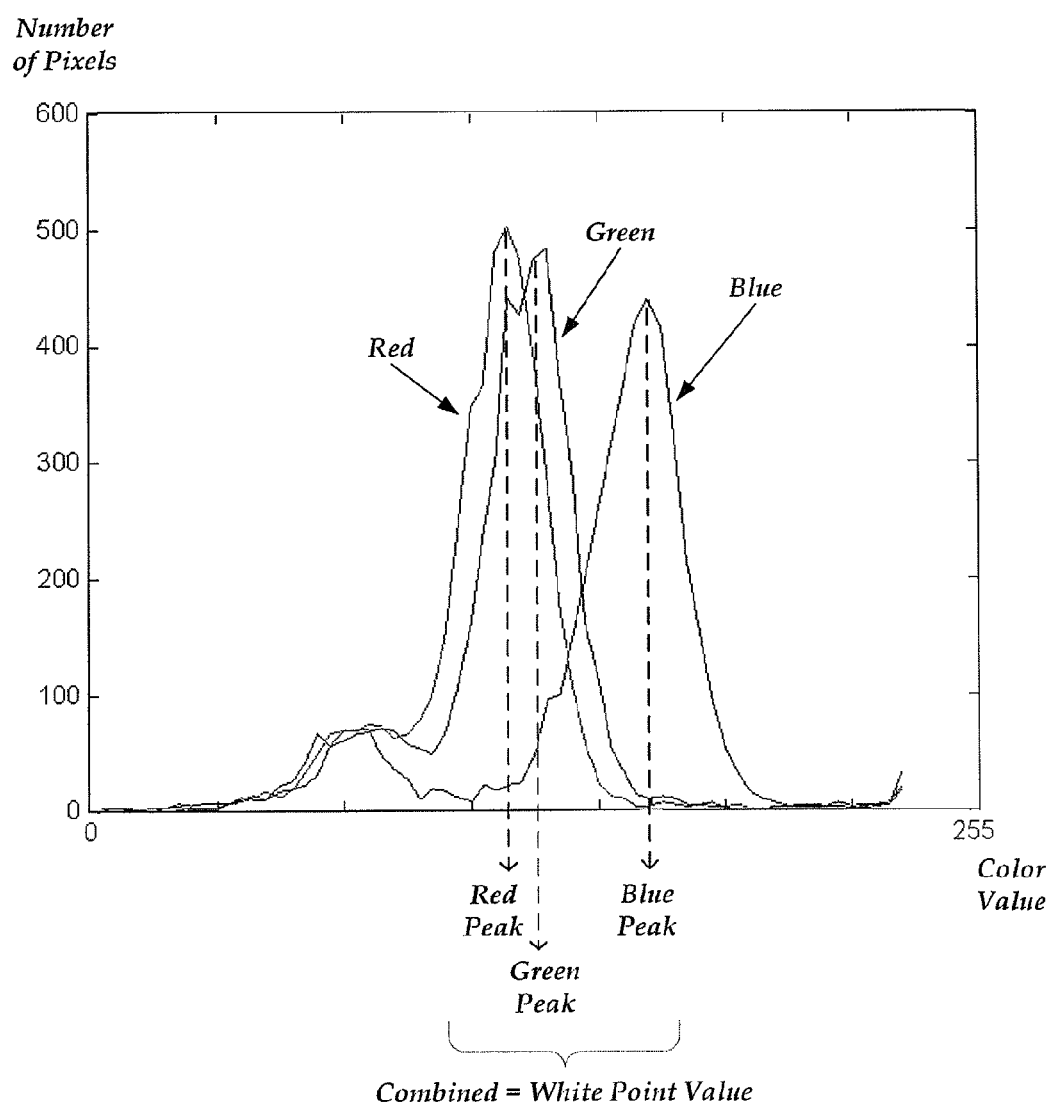
FIGS. 9 and 10 show use-case examples of embodiments of a histogram that may be employed to determine white point tracking.
Figure 10:
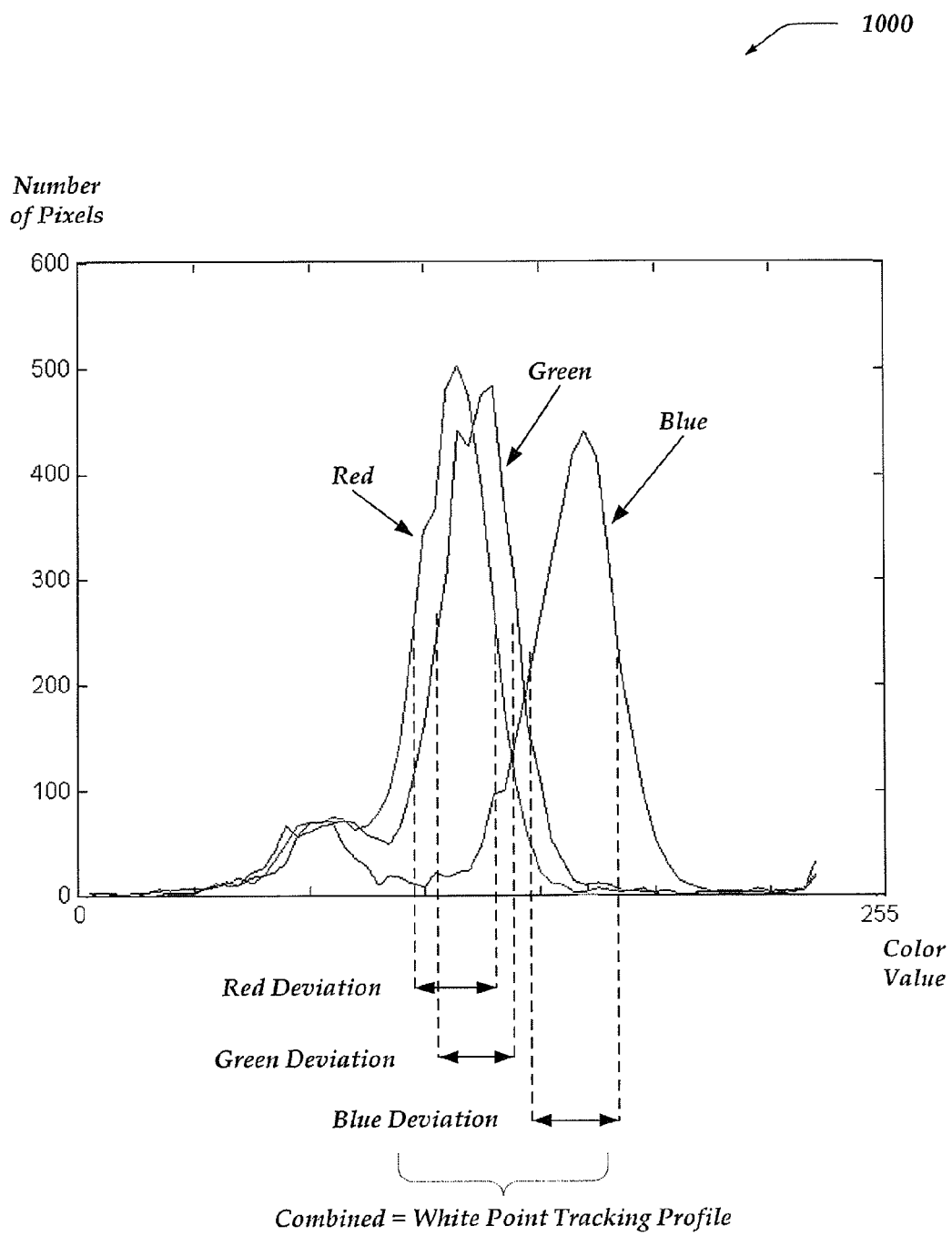

For each color channel, a histogram may be generated from the image data. In at least one embodiment, the histogram may have an x-axis that is the color value (e.g., 0-255 for an 8 bit color), and a y-axis that is the sum of pixels that have the corresponding color value. FIGS. 9 and 10 illustrate an example of a histogram with a plot of each separate color channel. In various embodiments, the histogram may be determined/generated in near-real time as the image data is obtained (i.e., scanned) and preprocessed.

Concurrently with the histogram determination, black point tracking may also be performed. Similar to the histogram, the black point tracking may be performed on each separate channel. Black point tracking may include determining a lowest color value for each color channel of the image data (or portion of the image data). In some embodiments, a register or variable (which may be referred to as black point tracking register) may be maintained for each color channel. As a pixel is processed, its color value for each channel may be compared to the value stored in the corresponding black point tracking register. If the pixel color value is less than the register color value, then the register color value may be modified or written over to be the pixel color value.

For example, assume there are black point tracking registers Reg_Red, Reg_Green, and Reg_Blue, and each has an initial color value of 255 (largest color value may be employed since the comparison is to find the lowest pixel color value), which may be represented as Reg_Red(255), Reg_Green(255), and Reg_Blue(255). A first pixel may be processed and may have the color profile Pixel_1_Red(155), Pixel_1_Green(255), Pixel_1_Blue(200). A comparison of each pixel color value with the corresponding register color values may indicate that the pixel's red and blue color values are less than the register color values. So, the registers may be updated to be Reg_Red(155), Reg_Green(255), and Reg_Blue(200). A second pixel may then be processed and may have the colors Pixel_2_Red (55), Pixel_2_Green(10), Pixel_2_Blue(222). After the comparison with the registers, the registers may have the color values Reg_Red(55), Reg_Green(10), and Reg_Blue(200). Each pixel in the image data (or portion of image data) may be processed until a final color value is in each register (e.g., Reg_Red(12), Reg_Green(10), and Reg_Blue(20)). The combination of these final register color values may be referred to as the black point. It should be understood that this example is not to be construed as exhaustive or limiting, and other methods of determining a lowest or minimum color value for each color channel in the image data (or portion of image data) may be employed.

In other embodiments, black point tracking may be based on color value average of pixels in an image. For example, assume the scanned data is input as pixel 1, pixel 2, pixel 3, pixel 4, pixel 5, pixel 6, pixel 7, pixel 8, pixel 9, pixel 10, pixel 11, pixel 12, . . . pixel 991, pixel 992, pixel 993, pixel 994, pixel 995, pixel 996, pixel 997, pixel 998, pixel 999, pixel 1000. If the window size is from 1 to N, then the average of pixels in groups of N may be determined. For example, if the windows size is 8, then:

pixel avg1=average (pixel 1, pixel 2, pixel 3, pixel 4, pixel 5, pixel 6, pixel 7, pixel 8)

pixel avg2=average (pixel 9, pixel 10, pixel 11, pixel 12, pixel 13, pixel 14, pixel 15, pixel 16)

. . .

pixel avg125=average (pixel 993, pixel 994, pixel 995, pixel 996, pixel 997, pixel 998, pixel 999, pixel 1000)

The histogram and blackpoint tracking may employ avg1, avg2 . . . and avg125, rather than the raw data from pixel 1, pixel 2, . . . pixel 1000.

In various embodiments, the histogram data collection/determination and the black point tracking may be performed in different components (e.g., hardware, DSP, firmware, or the like), either in series or in parallel. However, embodiments are not so limited and a single component may perform both actions.

Process 600 may proceed next to block 608, where the white point tracking may be determined based on the histogram. Since text documents typically have a greater percentage of background pixels than text pixels (or embedded photos), each color channel in the histogram may have bell-shaped curve or at least a partial-bell-shaped curve. From this information multiple statistics may be separately determined for each separate color channel. In some embodiments, the statistics may include a color value that corresponds to a peak number of pixels (i.e., the mode color value, or maximum number of pixels that have a same color value for a single color channel, or the most common color value among pixels employed to generate the histogram). This color value may be referred to as the peak color value. In other embodiments, the determined statistics may include the deviation (e.g., standard deviation) of the color value according to the peak color value. Again, these statistics may be determined for each separate color channel.

In at least one embodiment, the white point tracking profile may include ranges of color values for each separate color channel. Each color channel range may be determined based on the deviation of the color value according to the peak color value for that color channel. For example, assume the blue channel has a peak color value of 170 and a deviation of 30. The color range for the blue channel may be 140-200.

In various embodiments, hardware circuits may be employed to process, in a single pass, pixel data from a scanned image. The single pass hardware can maximize the performance of collecting histogram data, determining white point tracking, and determining black point tracking. In some embodiments, the single pass hardware circuit may allow flexibility to let software device how much of an image may be utilized to determine the black and white point tracking (e.g., the size of a scanned band of the image, as described below in conjunction with FIG. 7).

Process 600 may continue next at block 610. Various embodiments, of blocks 610, 612, and 614 are described in more detail below in conjunction with FIG. 8. Briefly at block 610, however, the gamma correction table may be modified such that pixels with a color profile that fall into the white point tracking profile can be set to a predetermined color value. In various embodiments, the predetermined color may be ideal white (i.e., each color channel at maximum color value, e.g., red(255), green(255), blue(255)). For example, assume a white point tracking profile of Red(95-130), Green(105-140), and Blue(142-175). If a pixel has a color profile of Pixel_Red(101), Pixel_Green(139), and Pixel_Blue(144), then the pixel profile falls into or matches the white point tracking profile and may be identified as a background pixel, and that pixel may be set ideal white, where Pixel_Red(255), Pixel_Green(255), and Pixel_Blue (255). However, if one of the color values of the pixel color profile does not match the corresponding color value range for the white point tracking profile, then that pixel may be identified as a non-background. It should be understood that other predetermined colors may also be employed, so long as the predetermined color is distinguishable from the non-background pixels (e.g., text).

In any event, process 600 may proceed to block 612, where black point compensation may be implemented. In various embodiments, the gamma correction table may be modified to stretch the color space based on the black point tracking. In at least one embodiment, each color channel may be stretched such that the corresponding black point value becomes zero (or other near zero value), so as to preserve the blackness of the non-background pixels. For example, assume the lowest red channel color value determined by the black point tracking is Red(24). So in this example, the red color spectrum may be identified as 24-255. The black point compensation may modify the gamma correction table to normalize the pixel red color values to be adjusted according to the range of 0-255.

Process 600 may continue at block 614, where the gamma correction may be employed. In various embodiments, a gamma correction table may be employed to compensate for properties of human vision. As indicated above, the gamma correction table may be modified to adjust for black point compensation and/or white point compensation. In various embodiments, block 614 may employ embodiments described in conjunction with blocks 804, 806, and 808 of FIG. 8, where gamma correction tables are employed to adjust the image pixels based on the white point compensation and/or black point compensation. So, the modified gamma correction table may compensate for properties of human vision while setting background pixels (i.e., those pixels with a color profile that matches the white point tracking profile) to ideal white (or other predetermined color) and also stretching the color spectrum based on the black point correction.

It should be noted that at least blocks 610, 612, and 614 may be performed in an order other than illustrated in FIG. 6.

Process 600 may proceed next to block 616, where the background pixels may be removed. In various embodiments, background pixels that are modified to have a color profile of the predetermined color (e.g., ideal white) are removed from the image data. After removal of the background pixels, the remaining image data may include text, images, and other non-background pixels. By employing embodiments described herein a text document may be scanned, the background (e.g., the paper color) may be removed, and the resulting scanned text can be printed on any paper independent of the background. So, a user can scan a yellow piece of paper that has text printed on it. Embodiments described herein may be employed to identify the yellow background (as the white point correction profile), set those pixels to ideal white, and remove those pixels from the scanned image. The resulting scanned image may show the document as if it had an ideal white background or no background at all. The user may then print the scanned image on any colored paper. And since there is no background, the original yellow paper is not printed onto the new paper.

Figure 7:
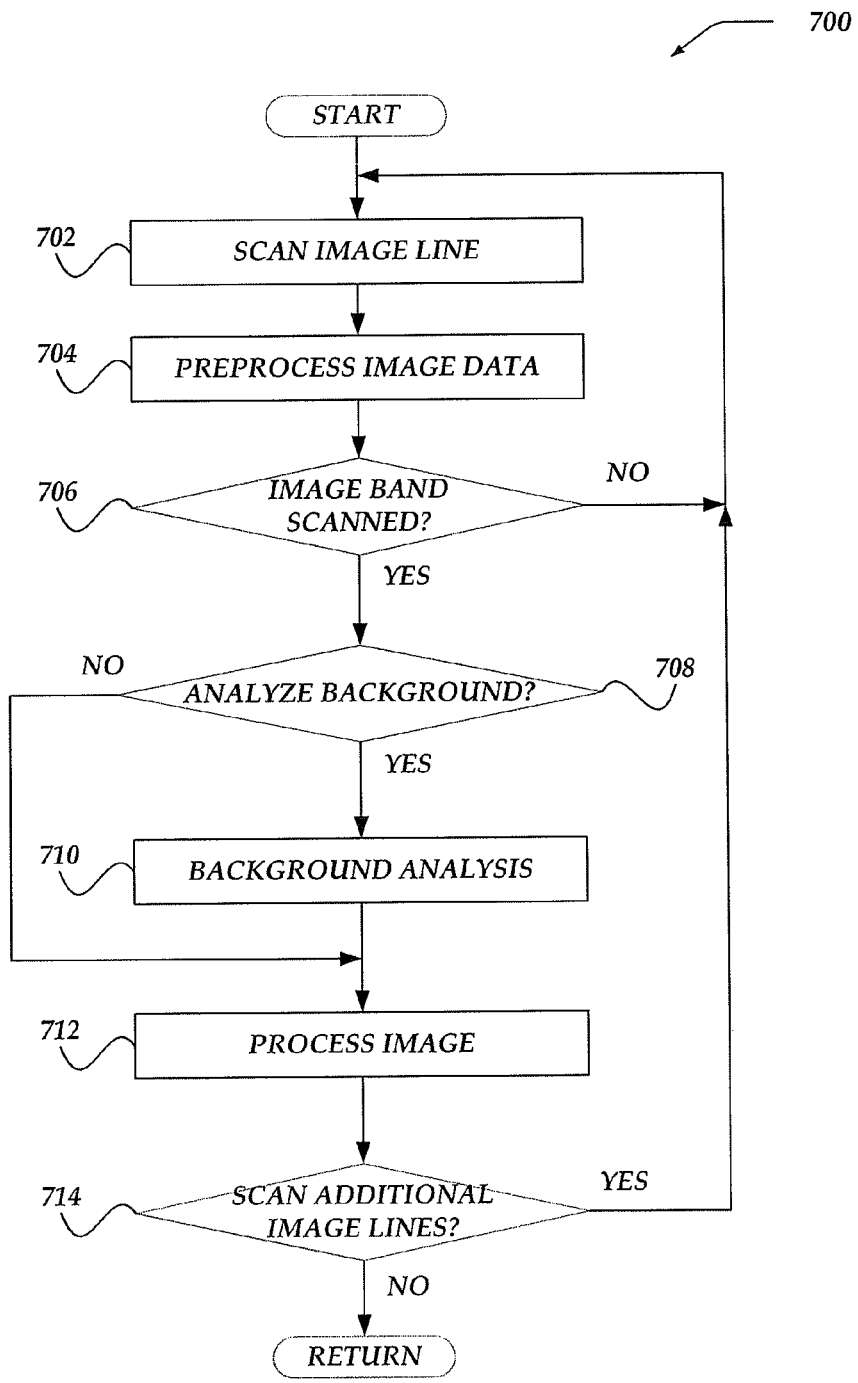
FIG. 7 illustrates a logical flow diagram generally showing an alternative embodiment of a process for determining white point compensation based on histogram data for removal of background pixels from an image and for determining black point compensation to stretch the color spectrum of the image.

FIG. 7 illustrates a logical flow diagram generally showing an alternative embodiment of a process for determining white point compensation based on histogram data for removal of background pixels from an image and for determining black point compensation to stretch the color spectrum of the image;

Process 700 may begin, after a start block, at block 702, where an image line may be scanned. In at least one of various embodiments, a scanned image line may be a horizontal row or line of pixels (that may be one or more pixels thick).

Process 700 may proceed to block 704, where the image data may be preprocessed. In various embodiments, block 704 may employ embodiments described in conjunction with block 604 of FIG. 6.

Process 700 may continue at decision block 706, where a determination may be made whether an image band has been scanned. In various embodiments, a band may be a predetermined number of lines of pixels or a predetermined distance (e.g., 5 mm) from an initial edge of the image (where an edge is parallel with the scanned line). In some embodiments, the entire image may be scanned before the background is analyzed. If the image band is scanned, then process 700 may flow to decision block 708; otherwise, process 700 may return to block 702 to scan additional image lines.

At decision block 708, a determination may be made whether the background may be analyzed. In some embodiments, a single band may have the background analyzed. A result from the background analysis may then be utilized for the remainder of the image. In other embodiments, multiple bands may be analyzed. In at least one embodiment, the background of each band may be separately analyzed and the result employed for that corresponding band. In another embodiment, the background analysis results from multiple bands may be combined (e.g., an average may be taken) to determine a final result that may be employed for the entire image. If the background is to be analyzed, process 700 may flow to block 710; otherwise, process 700 may flow to block 712.

At block 710, the background may be analyzed. In various embodiments, block 710 may employ embodiments described in conjunction with blocks 606-612 of FIG. 6. The result of block 710 may be the modified gamma correction table based on the white point compensation profile and/or black point compensation.

Process 700 may proceed to block 712, where image processing may be performed. In various embodiments, block 712 may employ embodiments of blocks 614 and 616 to employ the modified gamma correction table and to remove background pixels that are set to ideal white (or other predetermined color) based on the white point tracking and compensation. In some embodiments, background pixels may be removed after process 700 returns.

Process 700 may continue next at decision block 714, where a determination may be made whether additional image lines should be scanned. In some embodiments, additional lines may be scanned if only an initial band was previously scanned. In other embodiments, additional lines may be scanned if there are additional image lines that have not been scanned/processed. If additional image lines should be scanned, process 700 may loop to block 702 to scan an additional image line; otherwise, process 700 may terminate and/or return to a calling process to perform other actions.

In some embodiments, a separate histogram (and corresponding white point tracking profile) may be determined for each separate band in the image. In various different embodiments, each histogram may be employed in different combinations with each other to determine the white point tracking profile for corresponding bands, combinations of bands, subsequent bands, a combination thereof, of the like.

For example, in some embodiments, each histogram may be separately employed to perform white point tracking and compensation (e.g., determine and employ a white point tracking profile) to modify background pixels in each corresponding band.

In other embodiments, a white point tracking profile may be determined for each separate band from the separate histograms. These white point tracking profiles may be combined (e.g., averaged) to determine a total white point tracking profile, which may be employed to modify background pixels in the entire image.

In yet other embodiments, a histogram data may accumulate from band to band. For example, the white point tracking profile for the second band may be determined from the histogram for the first band and the second band (so background pixels in the second band may be modified based on the histogram from the first band and the second band); the white point tracking profile for the third band may be determined from a combined histogram for the first band, the second band, and the third band (so background pixels in the third band may be modified based on combined histogram from the first to the third band); and so on.

Embodiments are not so limited and other variations on the number of bands and/or combinations of bands to employ to determine histogram data (and thus white point tracking profiles) may be employed to modify background pixels in one or more bands. In various embodiments, each separate histogram may be referred to as a subset histogram and that each separate white point tracking profile may be referred to as a subset white point tracking profile. Two illustrative examples of employing image bands are illustrated in FIGS. 11A-11B and 12A-12B.

Figure 8:
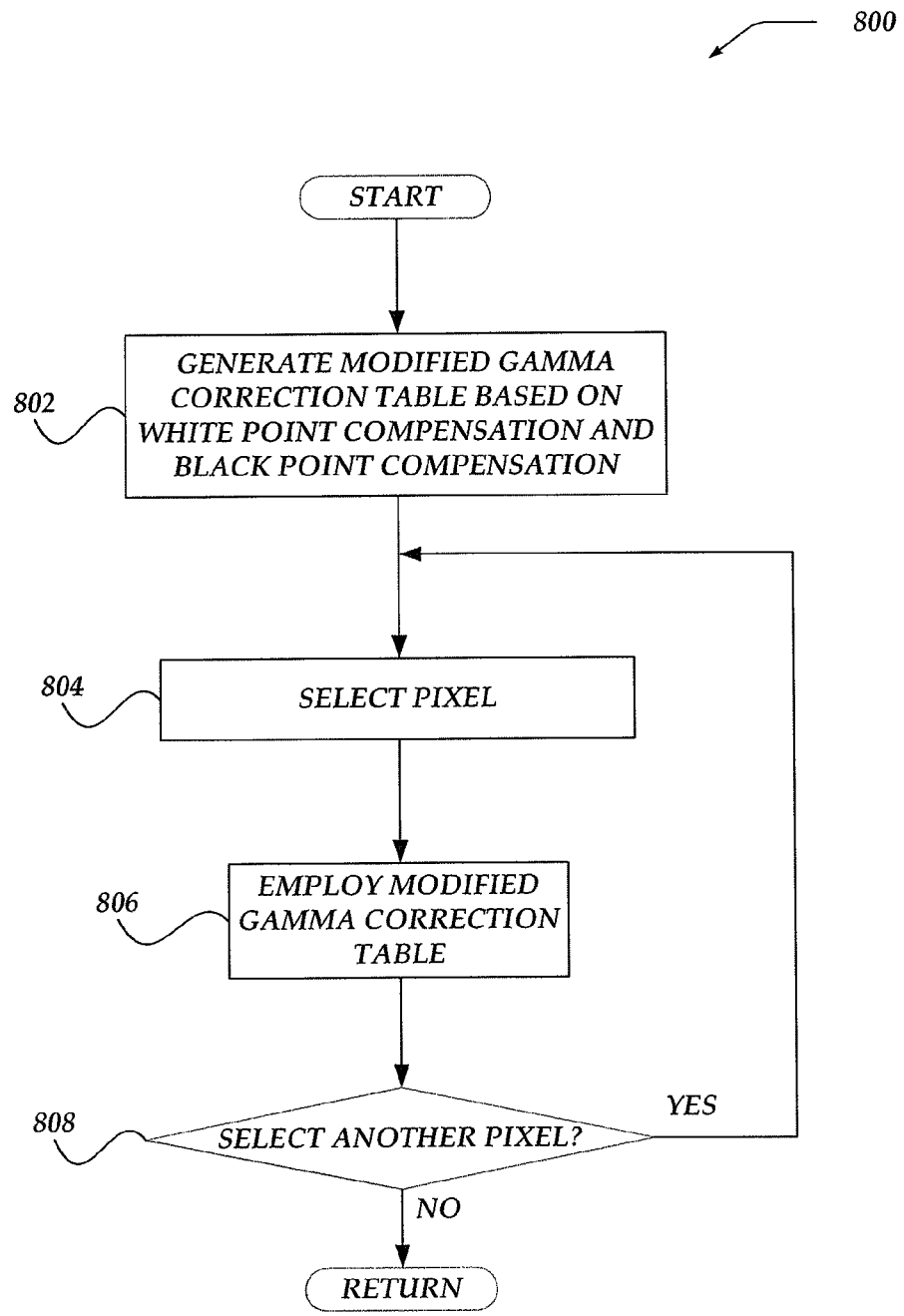
FIG. 8 illustrates a logical flow diagram generally showing an embodiment of a process for modifying and employing a gamma correction table based on white point compensation and black point compensation.

FIG. 8 illustrates a logical flow diagram generally showing an embodiment of a process for modifying and employing a gamma correction table based on white point compensation and black point compensation.

Process 800 may begin, after a start block, at block 802, where a modified gamma correction table may be generated based on the white point compensation and/or the black point compensation. In various embodiments, block 802 may employ embodiments described in conjunction with blocks 610 and/or 612 of FIG. 6.

In various embodiments, an initial gamma correction table may be determined based on a predetermined gamma value (which may be determined by an image processing device manufacturer, user, administrator, or the like) to correct for properties of human vision. In some embodiments, the initial gamma correction table may be modified to map pixel color values within the white point tracking profile to ideal white (or other predetermined color). In other embodiments, the initial gamma correction table may be modified to expand/stretch/enlarge the color spectrum of each color channel based on the black point tracking (e.g., map color values for each color channel for non-background pixels to new color values).

In some embodiments, a single or same gamma correction table may be modified and/or employed for both the white point compensation and the black point compensation. However, embodiments are not so limited, and in other embodiments, different/separate modified gamma correction tables may be employed, such as one modified gamma correction table for the white point compensation and a separate modified gamma correction table for the black point compensation.

In any event, process 800 may continue at block 804, where a pixel may be selected. In various embodiments, each pixel in the image may be selected for further processing (i.e., black point compensation and white point compensation). In some embodiments, multiple pixels may be processed in parallel. But for ease of illustration, pixels may be selected in series.

Process 800 may proceed next to block 806, where the modified gamma correction table may be employed. In various embodiments, the color values of the selected pixel may be adjusted, changed, or otherwise modified based on the mapping provided by the modified gamma correction table. In various embodiments, all pixels may be modified based on the modified gamma correction table. In some embodiments, those pixels identified as background pixels (e.g., have a color profile that fits into or matches the white point tracking profile) may be modified based on the white point compensation. In other embodiments, those pixels identified as non-background pixels may be modified based on the black point compensation (and not the white point compensation—noting that same or different modified gamma correction tables may be employed for both types of compensation).

In one non-limiting, non-exhaustive example, to identify if the selected pixel is a background pixel a determination may be made whether the color profile of the selected pixel matches the white point tracking profile. In various embodiments, each separate color value of the selected pixel may be compared to the corresponding color value range of the white point tracking profile. In at least one of various embodiments, this determination may be employed through the use of the modified gamma correction table. If each color value of the selected pixel falls within the corresponding color value range of the white point tracking profile, then the selected pixel may be identified as a background pixel. Otherwise, the selected pixel may be identified as a non-background pixel (which may be a text pixel, artifact pixel (e.g., dust or other pixel anomaly), or the like).

If the selected pixel is identified as a background pixel (i.e., the selected pixel profile matches the white point tracking profile), then the color values of one or more color channels of the selected pixel may be adjusted to ideal white (or other predetermined color value) based on the modified gamma correction table. For example, the selected pixel's red, green, and blue color values may be set to a maximum color value (e.g., 255). By employing the modified gamma correction table for background pixels, the background pixels may become a uniform color, rather than various shades of a color, without disrupting other colors in the scanned image.

If the selected pixel is identified as a non-background pixel (i.e., the selected pixel profile does not match the white point tracking profile) (e.g., at least one color value for a color channel falls outside the color value range for the corresponding color channel in the white point tracking profile), then the color values of one or more color channels of the selected pixel may be adjusted based on a mapping from the selected pixel's color values to gamma corrected values (e.g., based on the modified gamma correction table according to the black point tracking compensation).

Process 800 may proceed to decision block 808, where a determination may be made whether another pixel may be selected. In various embodiments, another pixel may be selected until each pixel in the image is selected and processed. As described herein, in some embodiments, the image may be processed in bands, in these embodiments, another pixel may be selected until each pixel in the band is proceeds. After the band is processed, the background of the next band may be processed to determine the black point tracking and white point tracking for the next band (e.g., by employing embodiments of FIG. 6 for each separate band).

If another pixel may be selected, then process 800 may loop to block 804 to select another pixel; otherwise, process 800 may terminate and/or return to a calling process to perform other actions.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), user-aided, or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Use Case Illustrations

FIGS. 9 and 10 show use-case examples of embodiments of a histogram that may be employed to determine white point tracking.

As illustrated, each color channel may be plotted in a histogram. Example 900 illustrates the color value—of a color channel—on the x-axis and the total number of pixels within an image (or portion of the image) that have that color channel value. A white point value may be determined by the combination of the mode color value, or color value that corresponds to the maximum number of pixels for each color channel. In some embodiments, this white point value may represent the current background color of the image.

Employing embodiments described herein may also include other statistics regarding each color channel. Example 1000 of FIG. 10 illustrates a calculated deviation (e.g., based on a standard deviation according to the mode color value) for each color channel. The combination of each color deviation (or color value range) may be the white point tracking profile. This white point tracking profile may be employed to identify those pixels that are part of the background. Since some background pixels may have slight color value variations, the white point tracking profile may enable a more accurate representation of the background color beyond using just the white point value (as shown in FIG. 9).

Figure 11A:
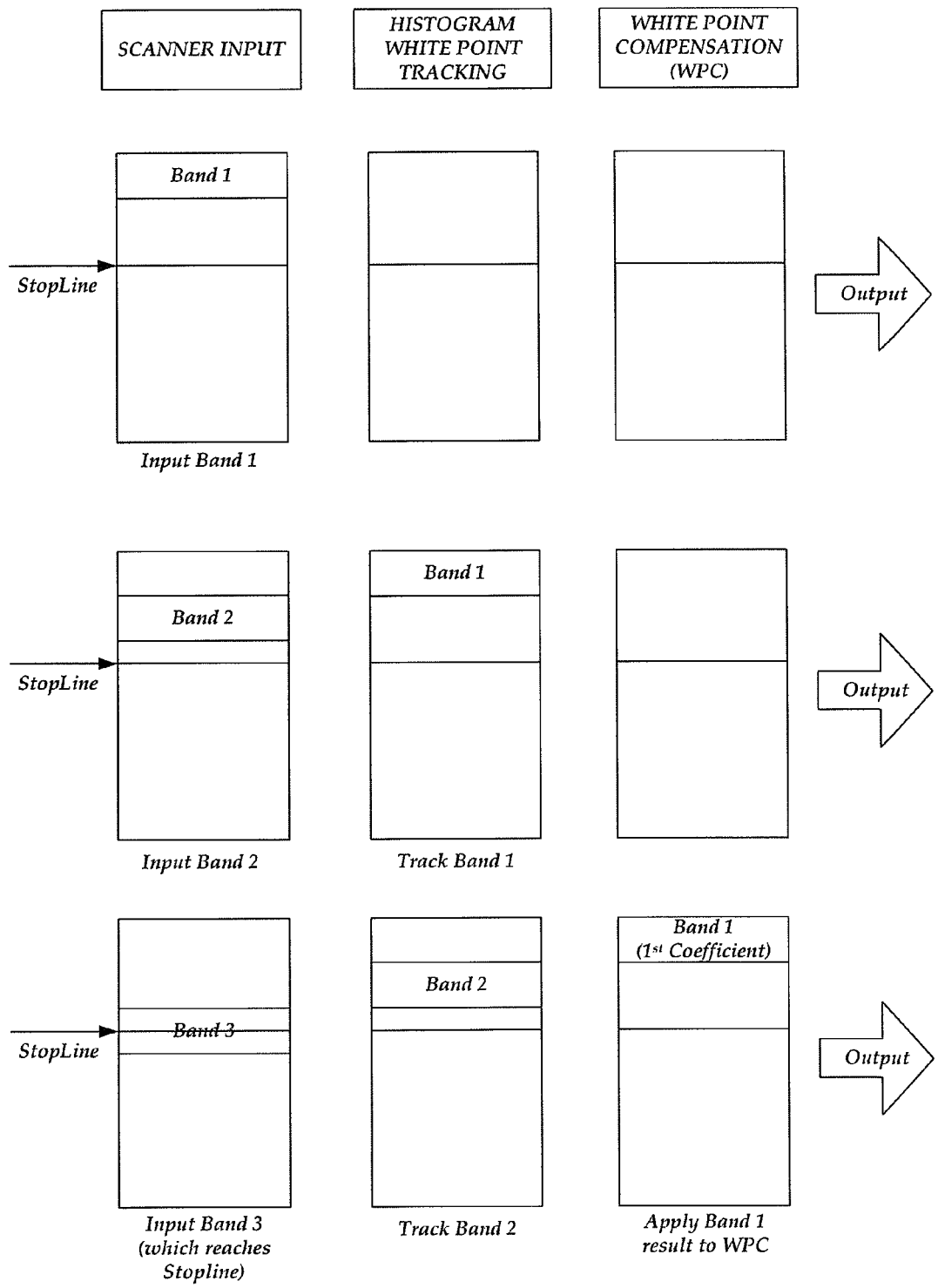
FIGS. 11A-11B and 12A-12B show use-case examples of diagrams generally showing embodiments of a process for scanning and processing bands of image data.
Figure 11B:
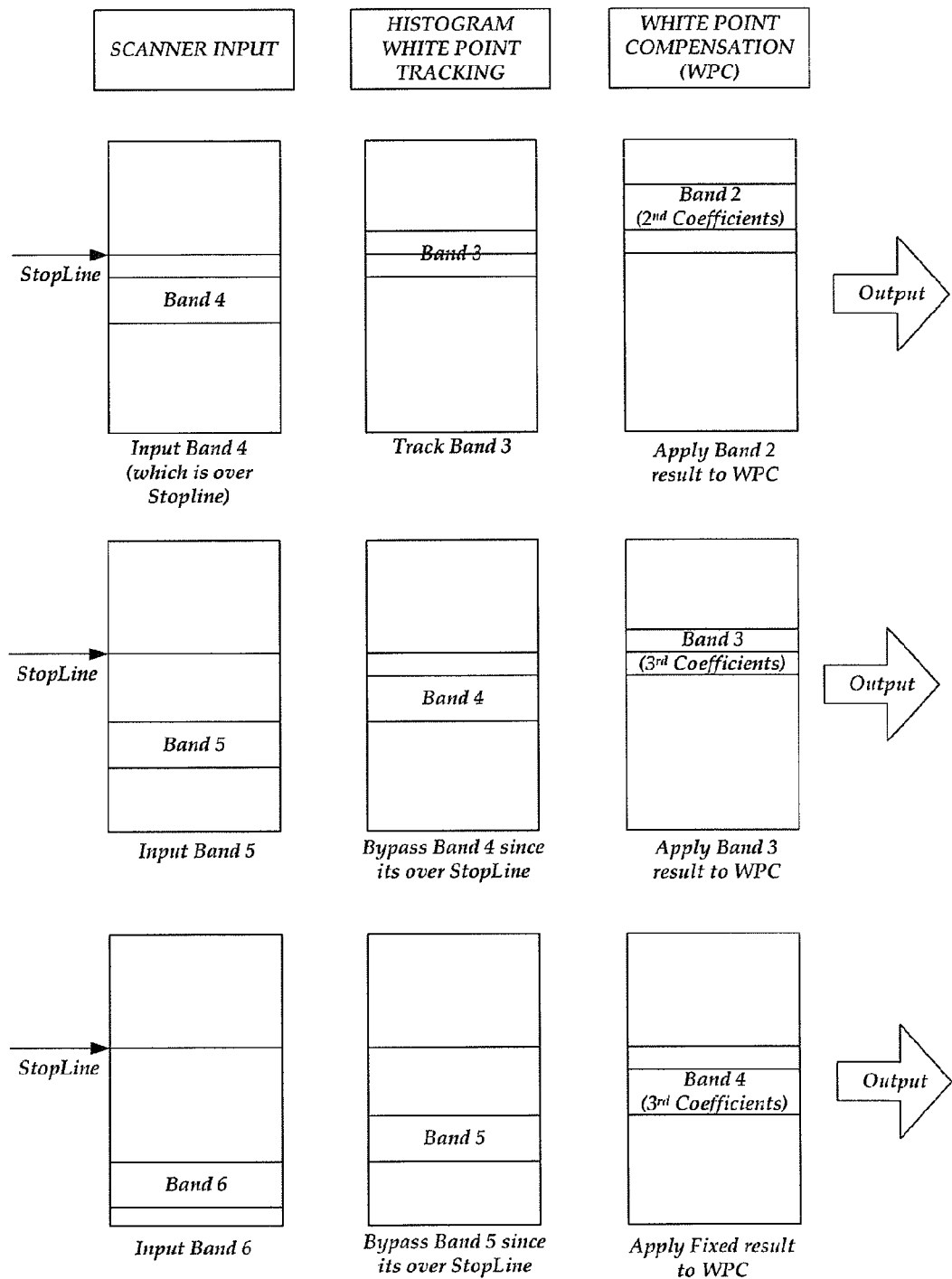

FIGS. 11A and 11B show use-case examples of diagrams generally showing embodiments of a process for scanning and processing bands of image data. As illustrated, three components—scanner input, histogram white point tracking (WPT), and white point compensation (WPC)—may be employed to pipeline process bands of image data. Each of these components may be employed in hardware, software, or a combination of hardware and software.

The scanner input component may be employed to scan data and provide preprocessing of the scanned data. In various embodiments, the scanner input component may employ embodiments of blocks 602 and 604 of FIG. 6.

The histogram WPT component may be employed to determine a histogram for each color channel and to generate a white point tracking profile from the histograms. In various embodiments, the histogram WPT component may employ embodiments of blocks 606 and 608 of FIG. 6.

The WPC component may be employed to at least identify and compensate background pixels based on the white point tracking profile. In various embodiments, the WPC component may employ embodiments of blocks 610, 612, 614, and 616 of FIG. 6.

Data may be processed in rounds or cycles, such that data (e.g., image data bands) can be pipelined through the various components. In some embodiments, a stopline may be determined, which may define a number of image lines to track or perform white point tracking FIG. 11A illustrates cycles 1-3 and FIG. 11B illustrates cycles 4-6, which may process image data bands (which may be referred to as a band-by-band mode or band-oriented mode) as follows.

Cycle 1: scanner input component may generate a first band.

Cycle 2: scanner input component may generate a second band. And the histogram WPT component may analyze the first band and may generate a first coefficient set (in some embodiments, a coefficient set may be a white point tracking profile; in other embodiments, the coefficient set may be information for how the gamma correction table may be modify based on the white point tracking profile).

Cycle 3: scanner input component may generate a third band. As illustrated, band three may include the stopline. The histogram WPT component may analyze the second band with the information in previous bands (e.g., the preceding band or a combination of multiple previous bands) and may generate a second coefficient set. The WPC component may compensate pixels (e.g., identifying background pixels and employing a modified gamma correction table) in the first band based on the first coefficient set.

Cycle 4: scanner input component may generate a fourth band. The histogram WPT component may analyze the third band with information in previous bands and may generate a third coefficient set. The WPC component may compensate pixels in the second band based on the second coefficient set.

Cycle 5: scanner input component may generate a fifth band. The histogram WPT component may skip and not analyze the fourth band because the stopline occurred prior to the fourth band. The WPC component may compensate pixels in the third band based on the third coefficient set.

Cycle 6: scanner input component may generate a sixth band. The histogram WPT component may skip and not analyze the fifth band because the stopline occurred prior to the fifth band. The WPC component may compensate pixels in the fourth band based on the third coefficient set (because the last coefficient set was from analysis of the third band).

Subsequent cycles may be performed and pixels may be compensated based on the third coefficient set until the entire image is processed. It should be recognized that the stopline could be the end of the image, such that each band is processed based on previous data.

Figure 12A:
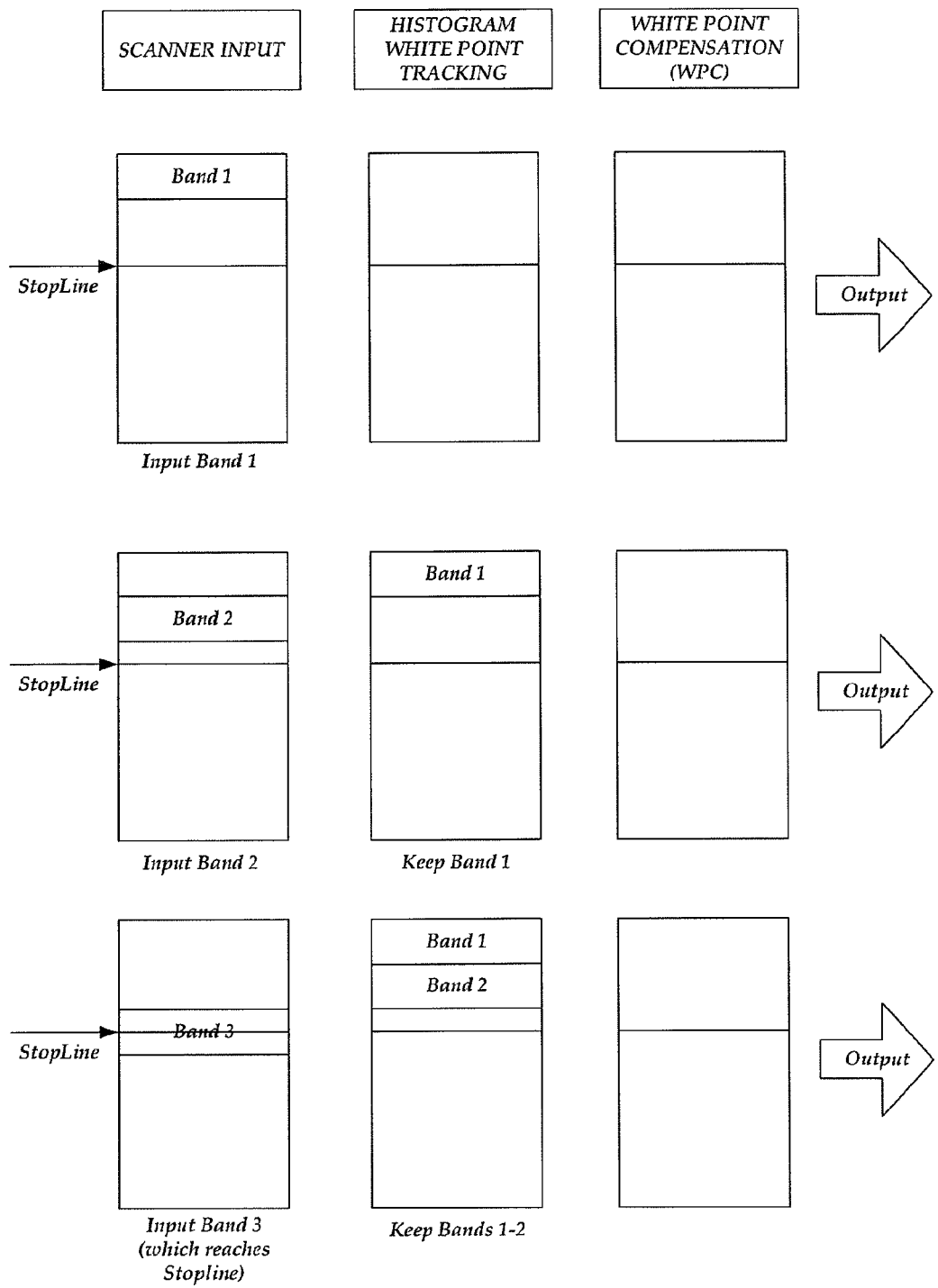
Figure 12B:
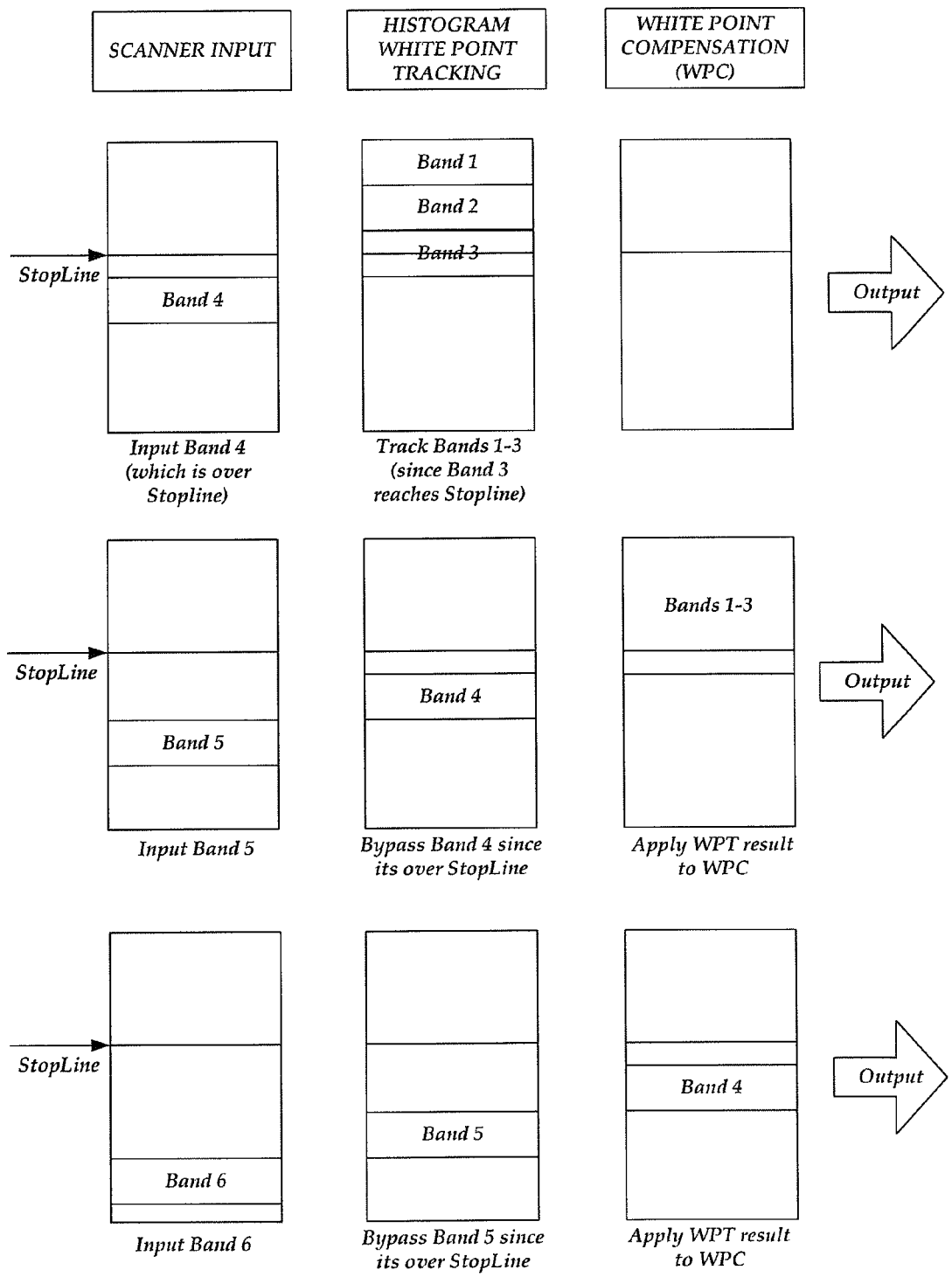

Similar to FIGS. 11A-11B, FIGS. 12A-12B may illustrate data being processed six cycles—FIG. 12A illustrates cycles 1-3 and FIG. 12B illustrates cycles 4-6. Briefly, FIGS. 12A-12B may illustrate a page-oriented mode (or look-ahead mode) that can buffer data until a stopline. The WPT component can calculate a result based on the buffered data and can pass the result (or coefficient set to the the WPC component. In various embodiments, the same coefficient set may be applied to the entire image. In this example, image data bands may be processed as follows.

Cycle 1: scanner input component may generate a first band.

Cycle 2: scanner input component may generate a second band. The histogram WPT component may store or queue the first band, but may provide further analysis at this point.

Cycle 3: scanner input component may generate a third band. As illustrated, band three may include the stopline. The histogram WPT component may store the first and second band. In various embodiments, the WPT component may store all bands prior to (or include) the stopline.

Cycle 4: scanner input component may generate a fourth band. The histogram WPT component may analyze a combination of the first, second, and third bands and may generate a coefficient set. In various embodiments, this coefficient set may be used to process all data bands.

Cycle 5: scanner input component may generate a fifth band. The histogram WPT component may skip and not analyze the fourth band because the stopline occurred prior to the fourth band. The WPC component may compensate pixels in the first, second, and third bands based on the coefficient set.

Cycle 6: scanner input component may generate a sixth band. The histogram WPT component may skip and not analyze the fifth band because the stopline occurred prior to the fifth band. The WPC component may compensate pixels in the fourth band based on the coefficient set.

Subsequent cycles may be performed and pixels may be compensated based on the same coefficient set until the entire image is processed.

In various other embodiments, a limited could be determined for "minimum" requested data. In various embodiments, once the minimum requested data is scanned (and preprocessed) the background analysis may begin. In some embodiments, if the minimum requested line is equal to the stopline, then processing may be similar to the look-ahead mode described above. If the minimum requested line is equal to a height of a band, then processing may be similar to the band-by-band mode described above.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for removing a background in a scanned image, comprising:
    determining a histogram of each color channel for at least an initially scanned portion of the scanned image, wherein the histogram represents a frequency distribution of pixels in the initially scanned portion across each color value for each color channel;
    determining a white point tracking profile based on the histogram, wherein the white point tracking profile identifies a range of color values for each color channel, wherein the range for each color channel is statistically related to a mode color value of a corresponding color channel;
    determining that a pixel of the pixels in the scanned image has a color profile within the white point tracking profile based on all color values of the color profile being within corresponding ranges of color values of the white point tracking profile, wherein the range of color values for each color channel that is statistically related to the mode color value of the corresponding color channel is determined based on a standard deviation of color values according to the mode color value;
    modifying the pixel to a predetermined color profile in response to determining that the pixel has the color profile within the white point tracking profile; and
    removing the modified pixel from the scanned image.

2. The method of claim 1, further comprising:
    determining black point tracking based on each color channel's lowest color value in at least the initially scanned portion of the scanned image; and
    expanding each color channel's color spectrum by normalizing each color channel's lowest color value to a predetermined color value.

3. The method of claim 1, wherein determining the white point tracking profile further comprises:
    determining another histogram for each color channel for each of a plurality of bands in the scanned image;
    determining a subset white point tracking profile for each of the plurality of bands in the scanned image based on a corresponding other histogram for each color channel for each of the plurality of bands; and
    determining the white point tracking profile by combining the subset white point tracking profiles.

4. The method of claim 1, further comprising:
    for each of a plurality of bands in the scanned image:
        determining another histogram for each color channel from a band in the scanned image;
        determining another white point tracking profile for the band based on at least the other histogram; and
        determining that at least a portion of pixels in the band are determined to have color profiles within the other white point tracking profile; and
        modifying the at least portion of pixels in the band to the predetermined color profile in response to determining that the portion of pixels in the band have the color profile within the other white point tracking profile.

5. The method of claim 1, further comprising:
    modifying a gamma correction table based on the white point tracking profile and the predetermined color profile, wherein the modified gamma correction table is employed to modify the pixels in the scanned image.

6. The method of claim 1, wherein the predetermined color profile includes a maximum color value for each color channel.

7. An image processing device for removing a background in a scanned image, comprising:
- a memory for storing instructions; and
- a processor that executes the instructions to enable actions, including:
  - determining a histogram of each color channel for at least an initially scanned portion of the scanned image, wherein the histogram represents a frequency distribution of pixels in the initially scanned portion across each color value for each color channel;
  - determining a white point tracking profile based on the histogram, wherein the while point tracking profile identifies a range of color values for each color channel, wherein the range for each color channel is statistically related to a mode color value of a corresponding color channel;
  - determining that a pixel of the pixels in the scanned image has a color profile within the white point tracking profile based on all color values of the color profile being within corresponding ranges of color values of the white point tracking profile, wherein the range of color values for each color channel that is statistically related to the mode color value of the corresponding color channel is determined based on a standard deviation of color values according to the mode color value;
  - modifying the pixel to a predetermined color profile in response to determining that the pixel has the color profile within the white point tracking profile; and
  - removing the modified pixel from the scanned image.

8. The image processing device of claim 7, wherein the processor that executes the instructions enables further actions, comprising:
- determining black point tracking based on each color channel's lowest color value in at least the initially scanned portion of the scanned image; and
- expanding each color channel's color spectrum by normalizing each color channel's lowest color value to a predetermined color value.

9. The image processing device of claim 7, wherein determining the white point tracking profile further comprises:
- determining another histogram for each color channel for each of a plurality of bands in the scanned image;
- determining a subset white point tracking profile for each of the plurality of bands in the scanned image based on a corresponding other histogram for each color channel for each of the plurality of bands; and
- determining the white point tracking profile by combining the subset white point tracking profiles.

10. The image processing device of claim 7, wherein the processor that executes the instructions enables further actions, comprising:
- for each of a plurality of bands in the scanned image:
  - determining another histogram for each color channel from a band in the scanned image;
  - determining another white point tracking profile for the band based on at least the other histogram; and
  - determining that at least a portion of pixels in the band are determined to have color profiles within the other white point tracking profile; and
  - modifying the at least portion of pixels in the band to the predetermined color profile in response to determining that the portion of pixels in the band have the color profile within the other white point tracking profile.

11. The image processing device of claim 7, wherein the processor that executes the instructions enables further actions, comprising:
- modifying a gamma correction table based on the white point tracking profile and the predetermined color profile, wherein the modified gamma correction table is employed to modify the pixels in the scanned image.

12. The image processing device of claim 7, wherein the predetermined color profile includes a maximum color value for each color channel.

13. A non-transitory processor-readable storage medium having stored thereon processor-executable instructions configured to cause a processor of a computing device to perform operations for removing a background in a scanned image, the operations comprising:
- scanning an image;
- determining a histogram of each color channel for at least an initially scanned portion of the scanned image, wherein the histogram represents a frequency distribution of pixels in the initially scanned portion across each color value for each color channel;
- determining a white point tracking profile based on the histogram, wherein the white point tracking profile identifies a range of color values for each color channel, wherein the range for each color channel is statistically related to a mode color value of a corresponding color channel;
- determining that a pixel of the pixels in the scanned image has a color profile within the white point tracking profile based on all color values of the color profile being within corresponding ranges of color values of the white point tracking profile, wherein the range of color values for each color channel that is statistically related to the mode color value of the corresponding color channel is determined based on a standard deviation of color values according to the mode color value;
- modifying the pixel to a predetermined color profile in response to determining that the pixel has the color profile within the white point tracking profile; and
- removing the modified pixel from the scanned image.

14. The non-transitory processor-readable storage medium of claim 13, wherein the stored processor-executable instructions are configured to cause the processor of the computing device to perform operations further comprising:
- determining black point tracking based on each color channel's lowest color value in at least the initially scanned portion of the scanned image: and
- expanding each color channel's color spectrum by normalizing each color channel's lowest color value to a predetermined color value.

15. The non-transitory processor-readable storage medium of claim 13, wherein the stored processor-executable instructions are configured to cause the processor of the computing device to perform operations such that determining the white point tracking profile further comprises:
- determining another histogram for each color channel for each of a plurality of bands in the scanned image;
- determining a subset white point tracking profile for each of the plurality of bands in the scanned image based on a corresponding other histogram for each color channel for each of the plurality of bands; and
- determining the white point tracking profile by combining the subset white point tracking profiles.

16. The non-transitory processor-readable storage medium of claim 13, wherein the stored processor-executable instructions are configured to cause the processor of the computing device to perform operations further comprising:

for each of a plurality of bands in the scanned image:
  determining another histogram for each color channel from a band in the scanned image;
  determining another white point tracking profile for the band based on at least the other histogram; and
  determining that at least a portion of pixels in the band are determined to have color profiles within the other white point tracking profile; and
  modifying the at least portion of pixels in the band to the predetermined color profile in response to determining that the portion of pixels in the band have the color profile within the other white point tracking profile.

17. The non-transitory processor-readable storage medium of claim 13, wherein the stored processor-executable instructions are configured to cause the processor of the computing device to perform operations further comprising:
  modifying a gamma correction table based on the white point tracking profile and the predetermined color profile, wherein the modified gamma correction table is employed to modify the pixels in the scanned image.

* * * * *